United States Patent
Fields et al.

(10) Patent No.: US 6,605,120 B1
(45) Date of Patent: Aug. 12, 2003

(54) FILTER DEFINITION FOR DISTRIBUTION MECHANISM FOR FILTERING, FORMATTING AND REUSE OF WEB BASED CONTENT

(75) Inventors: Duane Kimbell Fields, Austin, TX (US); Sebastian Hassinger, Blanco, TX (US); William Walter Hurley, II, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/210,200

(22) Filed: Dec. 10, 1998

(51) Int. Cl.$^7$ .............................................. G06F 17/21
(52) U.S. Cl. .................................... 715/513; 715/501.1
(58) Field of Search .............................. 707/513, 501.1, 707/511; 345/760; 715/513, 501.1, 511

(56) References Cited

U.S. PATENT DOCUMENTS

| 4,586,158 A | 4/1986 | Brandle ....................... 345/788 |
| 5,196,838 A | 3/1993 | Meier et al. ................. 345/684 |

(List continued on next page.)

FOREIGN PATENT DOCUMENTS

| EP | 762297 | * 12/1997 | ........... G06F/17/24 |
| JP | 10-133973 | 5/1998 | |
| WO | WO9726729 | 12/1996 | |
| WO | WO9727553 | 1/1997 | |

OTHER PUBLICATIONS

Digestor: Device–Independent Access To The World Wide Web (http://www.fxpal.xerox.com/papers/bic97).

IBM Technical Disclosure Bulletin, vol. 40 No. 12 p. 143, 12/97—Look Ahead Filtering of Internet Content.

IBM Technical Disclosure Bulletin, vol. 40 No. 12 p. 181, 12/97—Filtering Internet Content.

IBM Technical Diclosure Bulletin, vol. 40 No. 12 pp. 5–8, 12/97—Method for Dynamically Routing Web Requests to Different Web Servers.

IBM Technical Disclosure Bulletin, vol. 40 No. 07 pp. 1–4, 7/97—Service to Enable Common Gateway Interface Programs within Tivoli Management Environment Netfinity Based Internet Applications.

*Primary Examiner*—Stephen S. Hong
(74) *Attorney, Agent, or Firm*—Jeffrey S. LaBaw

(57) ABSTRACT

An automated means for defining a filter used to extract web content for a web page is disclosed wherein the extracted content is used in a recast web page. The recast web page may be produced by a hosting site, or may be part of an effort to revise a web site at a web content provider. First, a set of pages, possibly a single page, is retrieved from a content provider web server. Next, the web page is parsed to identify a set of selectable content elements. Next, a representation of the original web page is presented in a user interface, wherein the selectable content elements are demarcated. The user will select some of the elements for inclusion in the filter through the user interface, whereby the tool will indicate the selected content elements for inclusion in the filter. The tool constructs the filter so that when the filter is used, the selected content elements are extracted from a retrieved web page from the content provider web server and reused in the recast web page. As part of the process of identifying the selectable content elements, a set of varied headers can be used to retrieve multiple versions of the same web page. In this way, the multiple versions of the web page are compared to identify static and dynamic content elements and marked as static or dynamic.

27 Claims, 14 Drawing Sheets

U.S. PATENT DOCUMENTS

| | | | |
|---|---|---|---|
| 5,598,188 A | 1/1997 | Gove et al. | 345/531 |
| 5,602,997 A | 2/1997 | Carpenter et al. | 345/764 |
| 5,673,322 A | 9/1997 | Pepe et al. | 705/52 |
| 5,704,017 A | 12/1997 | Heckerman et al. | 706/12 |
| 5,706,502 A | 1/1998 | Foley et al. | 707/10 |
| 5,706,507 A | 1/1998 | Schloss | 707/104.1 |
| 5,708,780 A | 1/1998 | Levergood et al. | 709/229 |
| 5,835,914 A * | 11/1998 | Brim | 707/513 X |
| 6,009,429 A * | 12/1999 | Greer et al. | 707/513 X |
| 6,061,696 A * | 5/2000 | Lee et al. | 707/513 |
| 6,081,263 A * | 6/2000 | LeGall et al. | 345/760 |
| 6,085,199 A * | 7/2000 | Rose | 707/513 X |
| 6,105,027 A * | 8/2000 | Schneider et al. | 709/201 X |
| 6,112,242 A * | 8/2000 | Jois et al. | 707/513 X |
| 6,141,666 A * | 10/2000 | Tobin | 707/513 |
| 6,151,609 A * | 11/2000 | Truong | 707/513 X |
| 6,161,112 A * | 12/2000 | Cragun et al. | 707/513 X |
| 6,182,116 B1 * | 1/2001 | Namma et al. | 707/501 X |
| 6,199,082 B1 * | 3/2001 | Ferrel et al. | 707/515 X |
| 6,216,141 B1 * | 4/2001 | Straub et al. | 707/513 |
| 6,275,829 B1 * | 8/2001 | Angiulo et al. | 707/513 X |
| 6,279,015 B1 * | 8/2001 | Fong et al. | 707/513 X |
| 6,301,590 B1 * | 10/2001 | Siow et al. | 707/513 X |
| 6,321,242 B1 * | 11/2001 | Fogg et al. | 707/513 |
| 6,324,553 B1 * | 11/2001 | Cragun et al. | 707/513 |

* cited by examiner

FIG. 4B

FILTER DEFINITION FOR DISTRIBUTION MECHANISM FOR FILTERING, FORMATTING AND REUSE OF WEB BASED CONTENT

BACKGROUND OF THE INVENTION

The present invention relates generally to the data processing systems. More particularly, it relates to managing and formatting electronically-published material distributed over a computer network.

The World Wide Web is the Internet's multimedia information retrieval system. In the Web environment, client machines effect transactions to Web servers using the Hypertext Transfer Protocol (HTTP), which is a known application protocol providing users access to files (e.g., text, graphics, images, sound, video, etc.) using a standard page description language known as Hypertext Markup Language (HTML). HTML provides basic document formatting and allows the developer to specify "links" to other servers and files. In the Internet paradigm, a network path to a server is identified by a so-called Uniform Resource Locator (URL) having a special syntax for defining a network connection. Use of an HTML-compatible browser (e.g., Netscape Navigator or Microsoft Internet Explorer) at a client machine involves specification of a link via the URL. In response, the client makes a request to the server (sometimes referred to as a "Web site") identified in the link and, in return, receives in return a document or other object formatted according to HTML.

Among the many challenges in running a successful web site is the constant creation and updating the web pages and other files, i.e. web content, to keep the site fresh and new and attractive to web users. Web sites which do not update their content on a regular basis tend to lose their favor. Eventually, fewer "hits" are logged on the web site's pages as fewer users view the information or advertisements which the web site is publishing. As web based advertising fees are typically based on the number of hits a page or site receives, this reduction will directly and adversely affect the revenues of the web site. Of course, the constant update of the web content, while necessary to maintain the popularity of the site, is very expensive in terms of manpower and time.

Furthermore, much of the information on a particular web site is redundant when compared to information available on other similar sites. Some of this duplicate information represents differences in opinion and is no doubt the sign of a tolerant and free society. However, much of the information is simply a duplication of the same news on each web site. From the perspective of the web site content provider, it would be efficient if some of the information found on other sites could be reused or "hosted" on his site. Thus, additional manpower for writing and entering articles on the web server can be reduced or eliminated. Of course, such reuse is subject to the copyright laws and must be the subject of an agreement with the content provider of the source material.

While Web-based content exists in abundance, it is not necessarily easy to persuade a web content provider to share content on a low or no charge basis. This is especially true for Web-based news articles, as these news articles typically represent the major revenue generating content for the publisher by carrying advertising banners above and/or below the article text. Therefore, the web publishers are apt to charge a large amount for licensing the content to other sites for reprinting. Each reprint represents a loss of revenue under the standard arrangement of exporting the content in raw format to the licensing host and that host posting the articles on their own site without the publisher's advertisements.

Further, even if a web site operator could find a content provider willing to share their content at economically favorable terms, other problems exist. A single content provider may not be likely to provide the complete gamut of articles which the hosting web site would like to serve to its web clients. It would be preferable that the hosting site be able to use content from a variety of potential content providing web sites. Again, the likelihood of finding many willing quality web content providers is even lower. Yet even if this feat were accomplished, as each site has its own look and feel, if the content was presented in the format as it originally appeared on each of the web sites, the hosting site would present a disjointed hodgepodge collection of material. It is hardly the professional image that the hosting site should ideally project.

It is unlikely that a web content provider who is essentially sharing his content for free will be willing to install special software or specially format his information for the hosting site. If the material comes in raw format, considerable manpower must thus be devoted to making borrowed material on the hosting site look as though it was specifically created for the site. This effort is naturally compounded where material comes from a range of web content providers. Further, there is likely to be some lag between the time that the web content is available on the content provider's web page and its appearance on the hosting site. This dilutes the desired appearance of the hosting site having the latest and greatest material.

In reality, the hosting site is unlikely to find many partners without some convincing demonstration that its reuse of the material will somehow benefit the original content provider in some way, much less endanger his revenue stream.

The present invention solves this important problem.

SUMMARY OF THE INVENTION

It is an object of the invention to reduce the expense and effort of providing content in a new hosting web site or to update the content of an web content provider web site.

It is another object of the invention to reduce the effort needed to develop a filter for extracting desired content elements from a set of web pages.

It is another object of the invention to reuse content from a variety of different content providers some of which may use radically different formats and other content.

It is another object of the invention to adapt content from other web sites to the appearance of the hosting web site so that the content from a plurality of web sites appears native to the hosting web site.

It is another object of the invention to automatically update material on the hosting web site as it is changes on the content provider web sites.

It is another object of the invention to reuse web content in a plurality of hosting site web pages each with a respective appearance.

It is another object of the invention to reuse web-based content without requiring a content provider web site to modify content or install special purpose software.

It is another object of this invention to enable a publisher of an electronic document to control the reformatting of the document by a hosting site.

These objects and others are accomplished by an automated means for defining a filter used to extract web content for a web page wherein the extracted content is used in a recast web page. The recast web page may be produced by a hosting site, or may be part of an effort to revise a web site at a web content provider. First, a set of pages, possibly a single page, is retrieved from a content provider web server. Next, the web page is parsed to identify a set of selectable content elements. Next, a representation of the original web page is presented in a user interface, wherein the selectable content elements are demarcated. The user will select some of the elements for inclusion in the filter through the user interface, whereby the tool will indicate the selected content elements for inclusion in the filter. The tool constructs the filter so that when the filter is used, the selected content elements are extracted from a retrieved web page from the content provider web server and reused in the recast web page. As part of the process of identifying the selectable content elements, a set of varied headers can be used to retrieve multiple versions of the same web page. In this way, the multiple versions of the web page are compared to identify static and dynamic content elements and marked as static or dynamic.

The filter finds particular application in distribution mechanism for managing content on the World Wide Web by means of a filtering and formatting service located on a hosting server. The invention provides an automated system for recasting web content from a web content provider web site in the context of a hosting web site. At the hosting web site, it brokers a client browser's request for a web page, analyzes the returned content and splits it into component elements, extracts the desired component elements, recasts the desired elements in the look and feel of the hosting site and sends the recast content to the requesting client as a web page. Once the reformatted file is received at the client, the client browser interprets the HTML in the web page, presenting the content in the context of the hosting web site. On the content provider's web site, the details of the transaction in the web server logs are preserved, proxying a direct page view and ad impression.

The foregoing has outlined some of the more pertinent objects and features of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following.

BRIEF DESCRIPTION OF THE DRAWINGS

For a more complete understanding of the present invention and the advantages thereof, reference should be made to the following Detailed Description of the Preferred Embodiment taken in connection with the accompanying drawings in which.

DETAILED DESCRIPTION OF THE DRAWINGS

Figure 1:
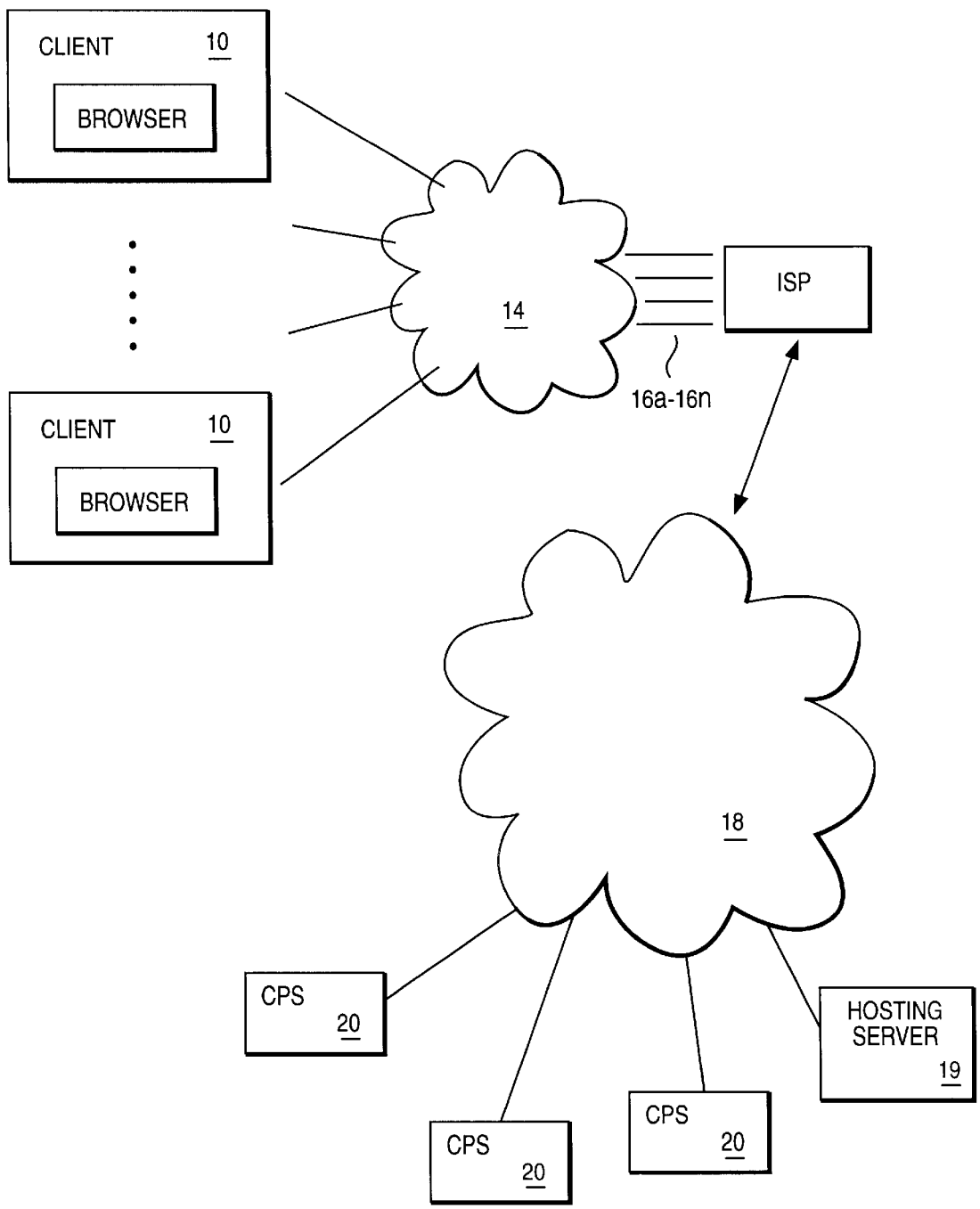
FIG. 1 is a representative system in which the present invention is implemented.

A representative system in which the present invention is implemented is illustrated in FIG. 1. A plurality of Internet client machines 10 are connectable to a computer network Internet Service Provider (ISP) 12 via a network such as a dialup telephone network 14. As is well known, the dialup telephone network usually has a given, limited number of connections 16a14 16n. ISP 12 interfaces the client machines 10 to the remainder of the network 18, which includes the hosting server 19 and a plurality of web content provider server machines 20. A client machine typically includes a suite of known Internet tools, including a Web browser 13, to access the servers of the network and thus obtain certain services. These services include one-to-one messaging (e-mail), one-to-many messaging (bulletin board), on-line chat, file transfer and browsing. Various known Internet protocols are used for these services. Thus, for example, browsing is effected using the Hypertext Transfer Protocol (HTTP), which provides users access to multimedia files using Hypertext Markup Language (HTML). The collection of servers that use HTTP comprise the World Wide Web, which is the Internet's multimedia information retrieval system.

Figure 2:
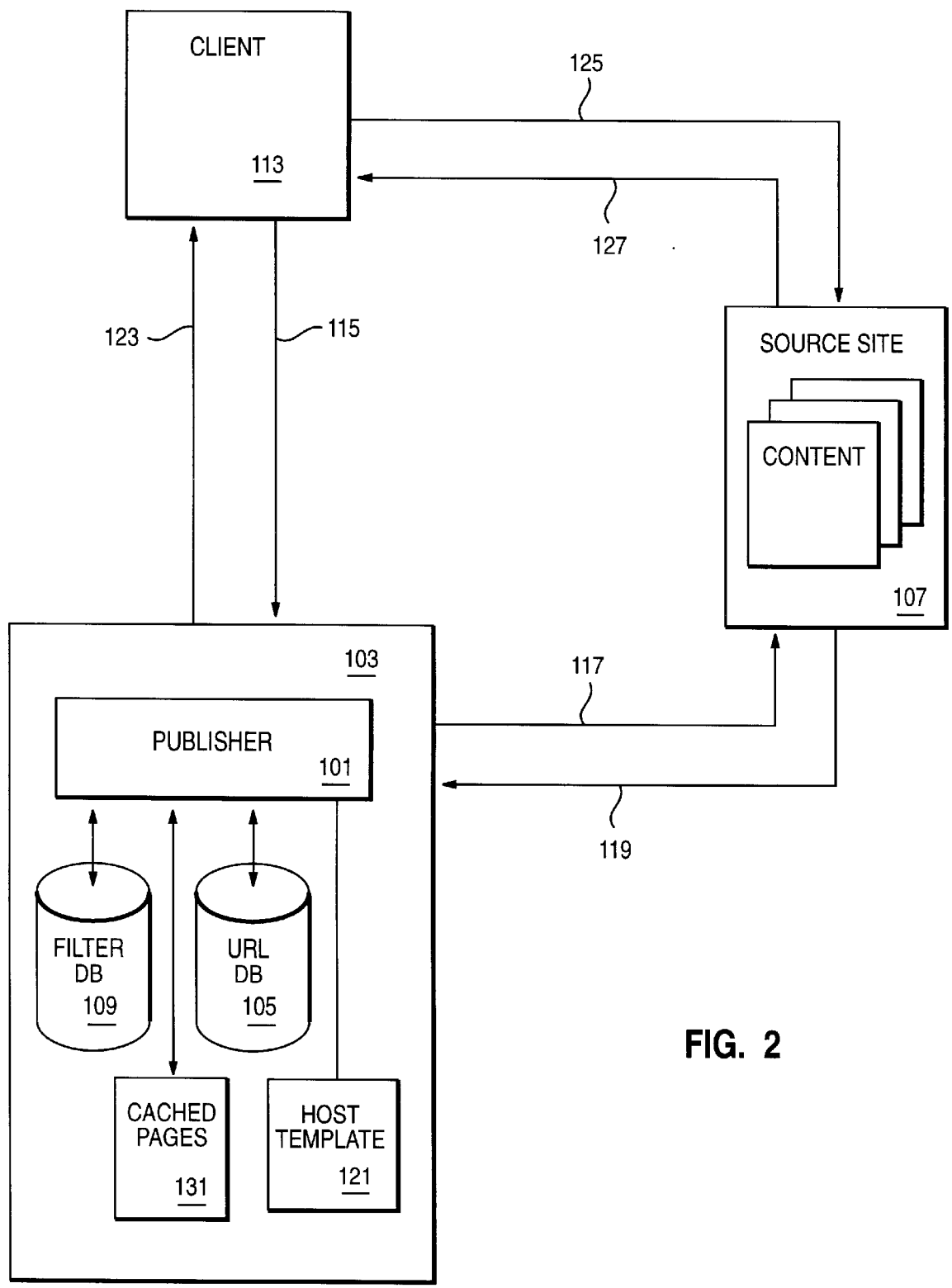
FIG. 2 is a simplified block diagram of a requesting client, hosting server and plurality of content provider servers which illustrates an overview of the process of the present invention.

As shown in FIG. 2, the invention is a method and system for extracting Web-based content, especially, but not limited to, Web-based news articles, from content provider or source Web sites for use by the hosting or "pass-through" Web site. These articles typically are revenue-generating content for the publisher by carrying advertising banners above and/or below the article text. Therefore, the publishers must benefit from the arrangement provided by the hosting site to be interested in licensing their content for a low or no fee. As explained below, the web content provider maintains his ad revenue as the number of "hits" on the advertisements are maintained in a transparent manner. As the articles are also posted at the hosting site, ad revenues can actually increase since the ad impressions are being solicited from two sites rather than one.

During configuration, the pass through publisher 101 at the hosting site 103 is provided with the URLs 105 for the desired content provider web servers 107 and a set of filters 109 for the content publisher's document templates 111. For ease in illustration, a single client 113 and a single web content server 107 are depicted. However, the reader should understand that a plurality of clients and web content servers are typically interconnected through the agency of the hosting site. Upon a request 115 from a client 113 for a given web page, typically made through an HTTP request from the resident browser, the process for providing a page using the pass through mechanism begins. Next, after having established that the requested page originates at the web content server 107, the hosting site makes a request 117 for the page. Presuming that this is a first request for the web page or that a more up to date version of the page is available at the web content provider than is cached locally, the page is returned 119. In today's web technology, the web page is typically an HTML file with references to the component .wav, .mov, .gif and JPEG files which together make up the web page as perceived by the user. Secondary page components such as cascading style sheets and Java applets can also be accommodated by the invention. The list above is merely exemplary; any component on a web page can be extracted and recast into the hosting site context by the present invention.

Next, the pass through publisher 101 retrieves the filter definitions and policies from the filter database 109 for this particular content provider web site. Using the filters and the retrieved HTML page, the pass through publisher 101 parses the HTML source for desired components of the page. Typically, this is the title of the article, the ad banner or banners and the article text itself, although other items on the page are potentially desirable. These pieces of content are then recast into a new web page by means of an HTML template 121 that matches the look and feel of the hosting Web site. The new page includes the graphics of the hosting provider as well as the navigational features of the hosting site. This page is then sent 123 to the client 113 for presentation by the browser. In a typical web interaction between browser and server, once the browser receives the HTML page, it issues additional requests for the component files such as .gifs, e.g., ad banners. For the ad banners themselves, the new page preserves the call 125 back to the content provider so that the correct advertising content is presented. It is common that each request of a web page from a server can be refreshed with a different advertisement.

In this way, the end user receives a page with graphic and navigation features from the hosting Web site that has an embedded article from the publisher and an advertisement served off of the publisher's site. The final result is content viewed by the end user in host site's native Web context, with an ad banner served from the original publisher, thereby preserving their revenue stream.

It should also be noted that the article text is preferably cached in a local cache 131, on the hosting Web server 103, for faster access and guaranteed access in the event that the publisher's Web site becomes inaccessible. The invention encompasses several variations in the types of information parsed from the page and cached locally. Some of this information may be incorporated in the recast HTML page and some may be used for version checking. For example, information in the HTML header such as "last modified", "content length" and "content type" could be kept with the article text so that the copy in the cache can be compared to the version available at the content provider site. However, in the preferred embodiment, the applicants have found it to be more efficient to simply compare the "last modified" data in the HTML header with the "last modified" data in the hosting system's cache file. Remember that the hosting site 103 makes the request 117 for the client to preserve the accounting data for the content provider web site 107. Since the header data is among the first to be transmitted 119 in response, after a simple compare establishes that the cached version and the version currently available at the content provider web site are the same, the transmission 119 from the content provider can be ended. The hosting system 103 then uses the cached copy of the article. In the event of no response from the content provider web site, a cached copy of the article is used. When there is no cached copy of an article, or the compare establishes that a more recent version of the article is available, the entire transmission 119 from the content provider is received for processing. Alternatively, rather than waiting for a client request, the 'freshness' of the cached content can be ascertained by automatically generating HTTP requests from the cached URLs and monitoring data in the HTTP headers when the page is hit in the background, updating the cache any time the web content provider changes their data.

The aim of caching pass-through web content is to maximize efficiency by minimizing network bandwidth requirements while preserving the transparency of the transaction. By caching copies of the parsed content on the hosting server, serving the content to the end user directly and simulating their 'hit' on the publisher's site in the background, the end user gets content directly from hosting site without having to wait for data to travel from the content web provider's site to the hosting site. However, this method only assures a correct count for the web content provider whose advertising systems use a secondary HTTP request for the image retrieval to generate the ad impression. For systems that rely on dynamic HTML generation to log ad impressions, the ad content must be retrieved for each user and not cached on the host site. The static portion of the page, i.e. the article, however, can be cached, since it remains the same for each visit at least for a relatively long period of time. Serving the recast page to the end user will be delayed by the network for retrieving the ad content, but if the publisher's site becomes unavailable, the end user will not be affected.

An alternative embodiment to the invention is to provide a client based Java applet that retrieves dynamic content from the web content provider's server directly from the end user's browser. This allows the recast page to be loaded from the hosting site's cache to the client browser and invoking the Java applet for the retrieval of marked dynamic content. This reduces the network bottleneck at the hosting site for dynamic HTML ad generation.

Figure 3A:
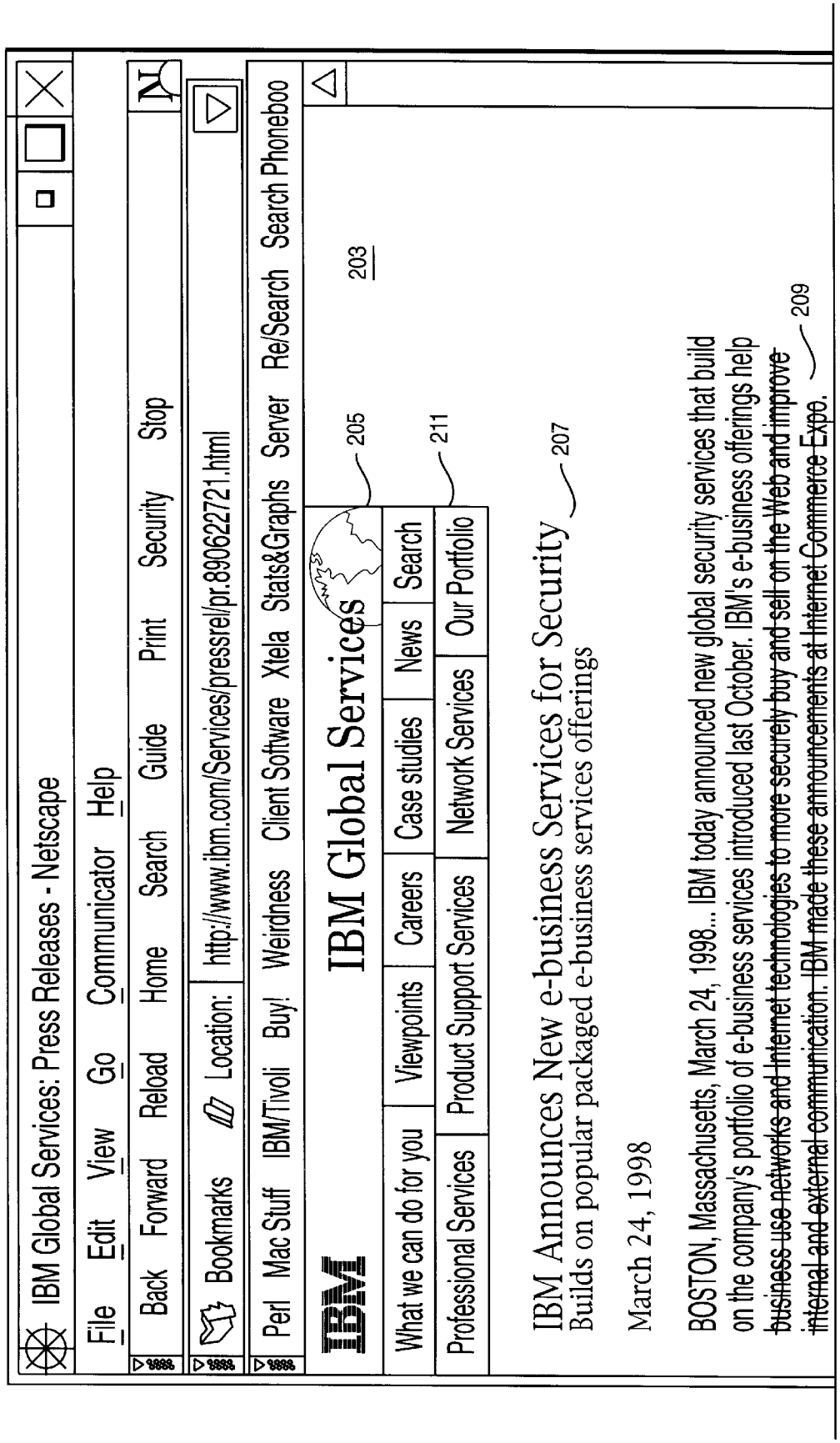
FIG. 3 is an illustrative example of an unchanged source web page as it would normally be presented by a client browser as retrieved from the content provider web server.
Figure 3B:
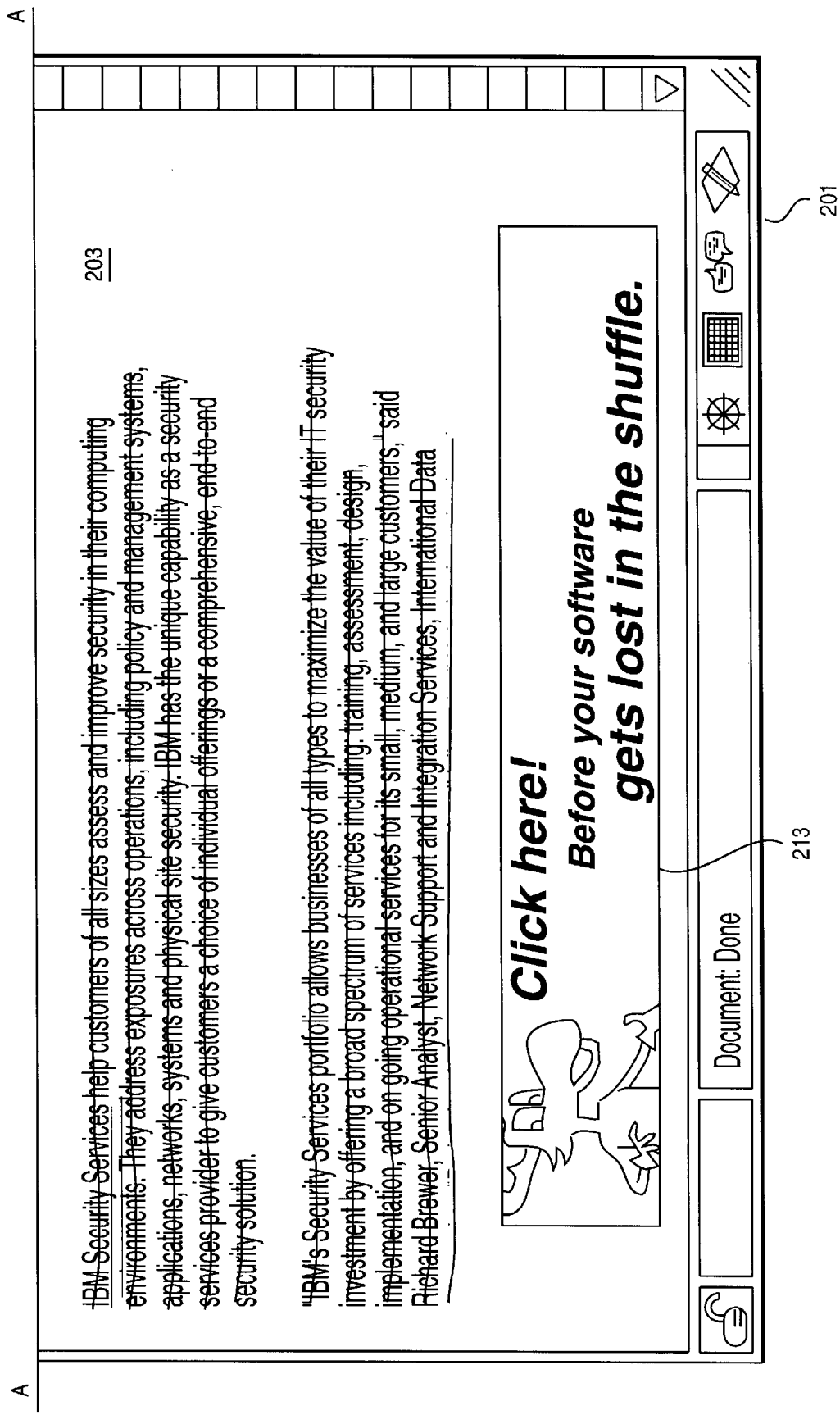
Figure 4A:
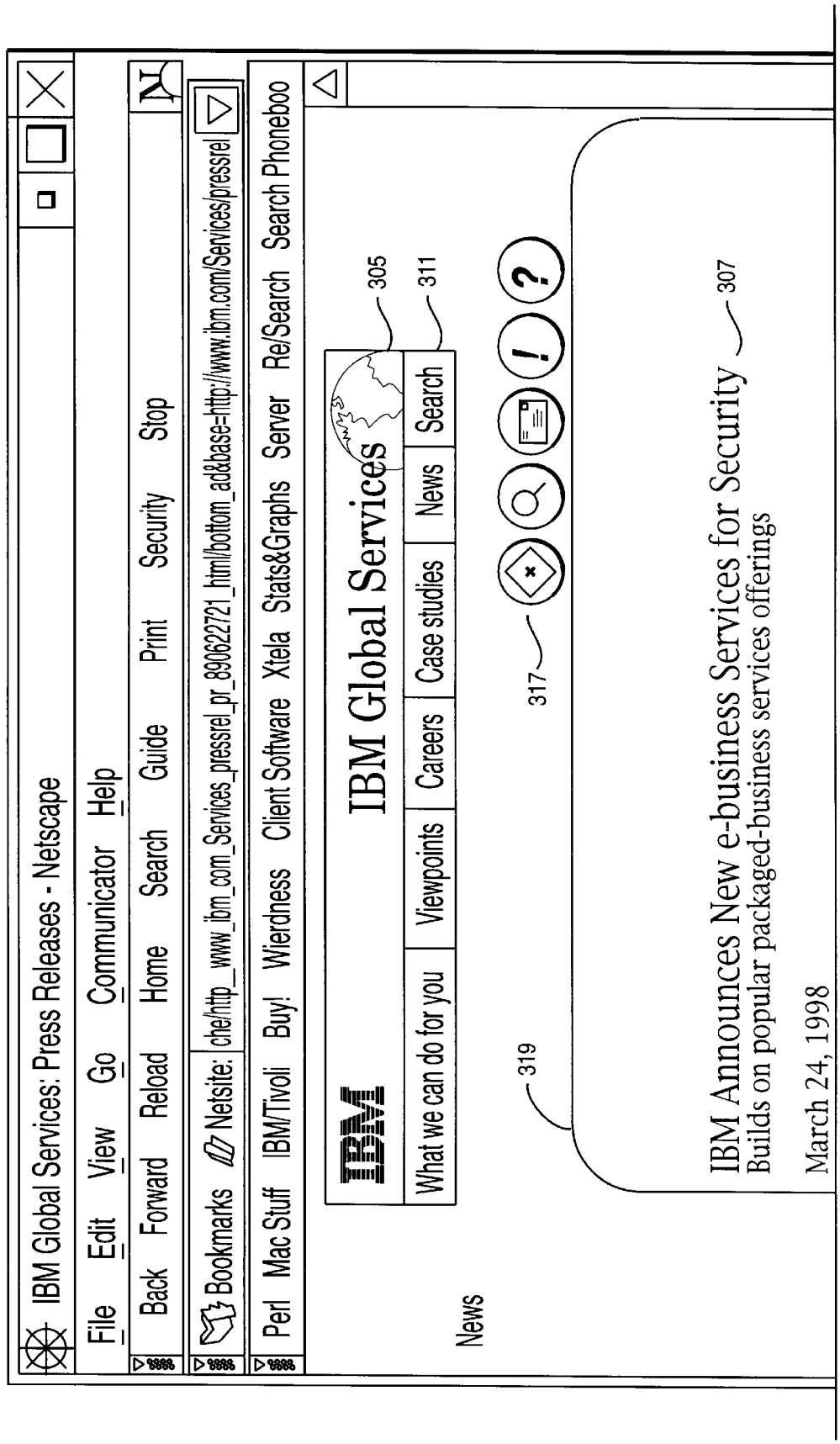
FIG. 4 is an illustrative example of the reformatted web page as presented at the client browser after having undergone the processing of the present invention.
Figure 4B:
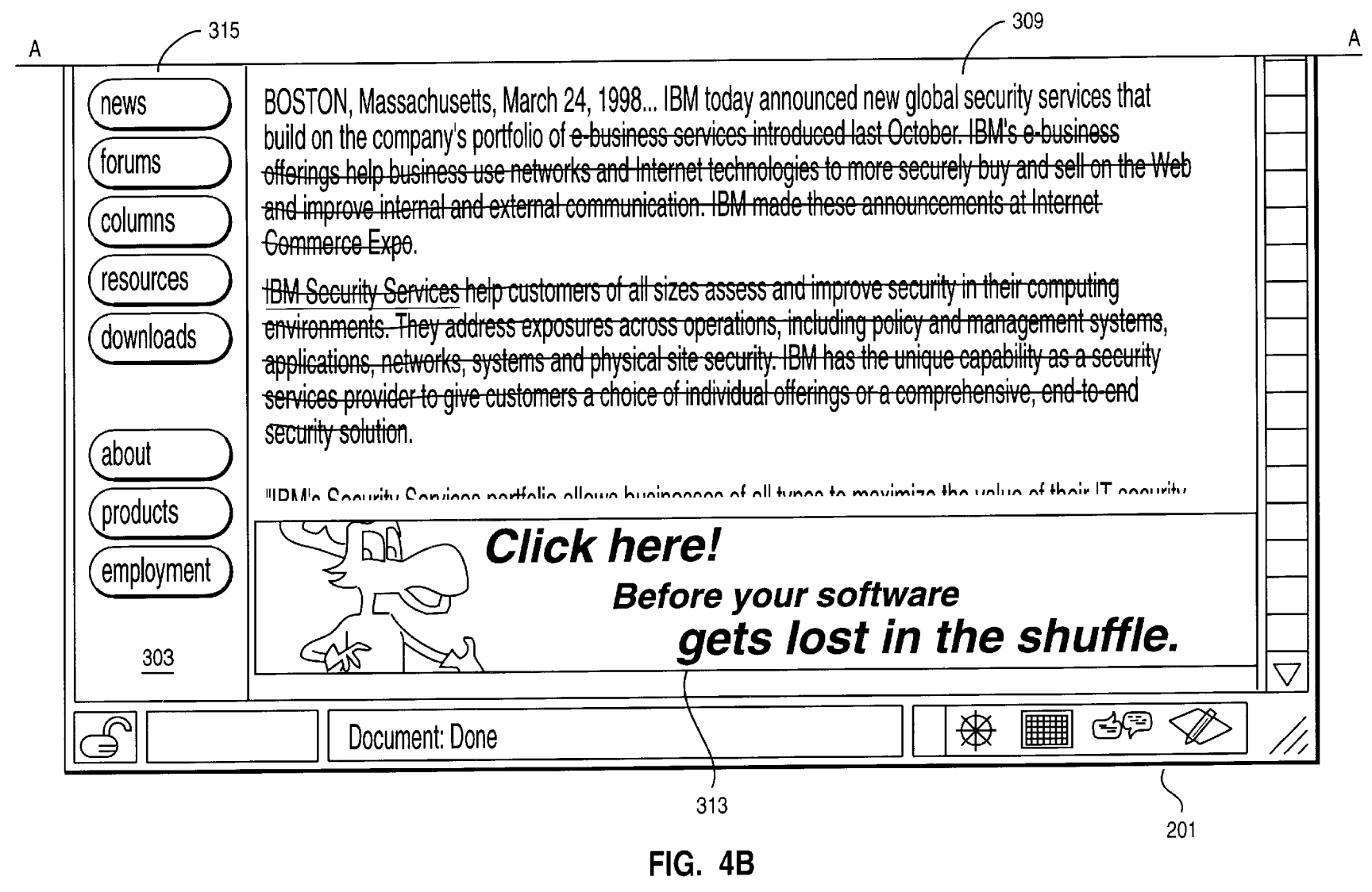

Before describing the hosting process in greater detail, the reader's attention is directed to FIGS. 3 and 4 which respectively show the appearance of a content provider web page as originally sent and the recast web page as sent from the hosting site. It should be understood that the page in FIG. 3 is never actually displayed by the client browser, however, showing the page as it would have been presented if the client had made the request directly to the content provider web site is useful to understand the principles of the invention.

As shown in both figures, the browser window 201 bounds each web page and contains standard graphical user interface elements such as title bars, menu items and scroll bars. The browser shown is Netscape Communicator, showing that a standard client browser can be used unmodified to practice the invention. In the client area 203 showing the unmodified page, the logo banner 205, title area 207 and article text 209 are shown. Under the logo banner 205, a set of links 211 will retrieve other pages from the content provider server. Finally, at the bottom of the page, an ad banner 213 is presented.

In FIG. 4, the recast page is shown in client area 303. In this example, the logo banner 305 is preserved, but moved to a new location (centered). The title area 307 and article text 309 have changed location, font and font size and line length. Other format changes are possible. Some, but not all of the links 311 to other content provider web pages have been preserved according to the policy for the web content provider. Since these links may be important to the web content provider to generate additional hits for other advertising revenue, the provider may wish to institute a policy that at least some of these links will be preserved in the recast page. The ad banner 313 appears at the bottom of the page. Note also that navigational features 315 and 317 native to the hosting server have been added to the page. A background border 319 giving the hosting web site a distinctive look and feel has also been added. Of course, those skilled in the art will recognize that the examples of "desired content" are merely exemplary. The example of the top ad, article and bottom ad is common to many web news articles. The invention allows the hosting site to extract and recast any number or type of desired content elements from the web content provider page.

Depending upon the policy for the web content provider, variations in which elements are preserved in the recast page are possible. For example, the logo 305 is an optional feature. It may be removed or reduced in size or replaced by a different logo stored in the filter definition. The links 311 are optional; they could be removed, reformatted or relocated. As a technical matter, the ad banner 313 is optional, however, from a practical standpoint to obtain content at a low licensing fee, they are probably mandatory. Other items such as copyright notices are not shown in the figure, but could be preserved.

Figure 5A:
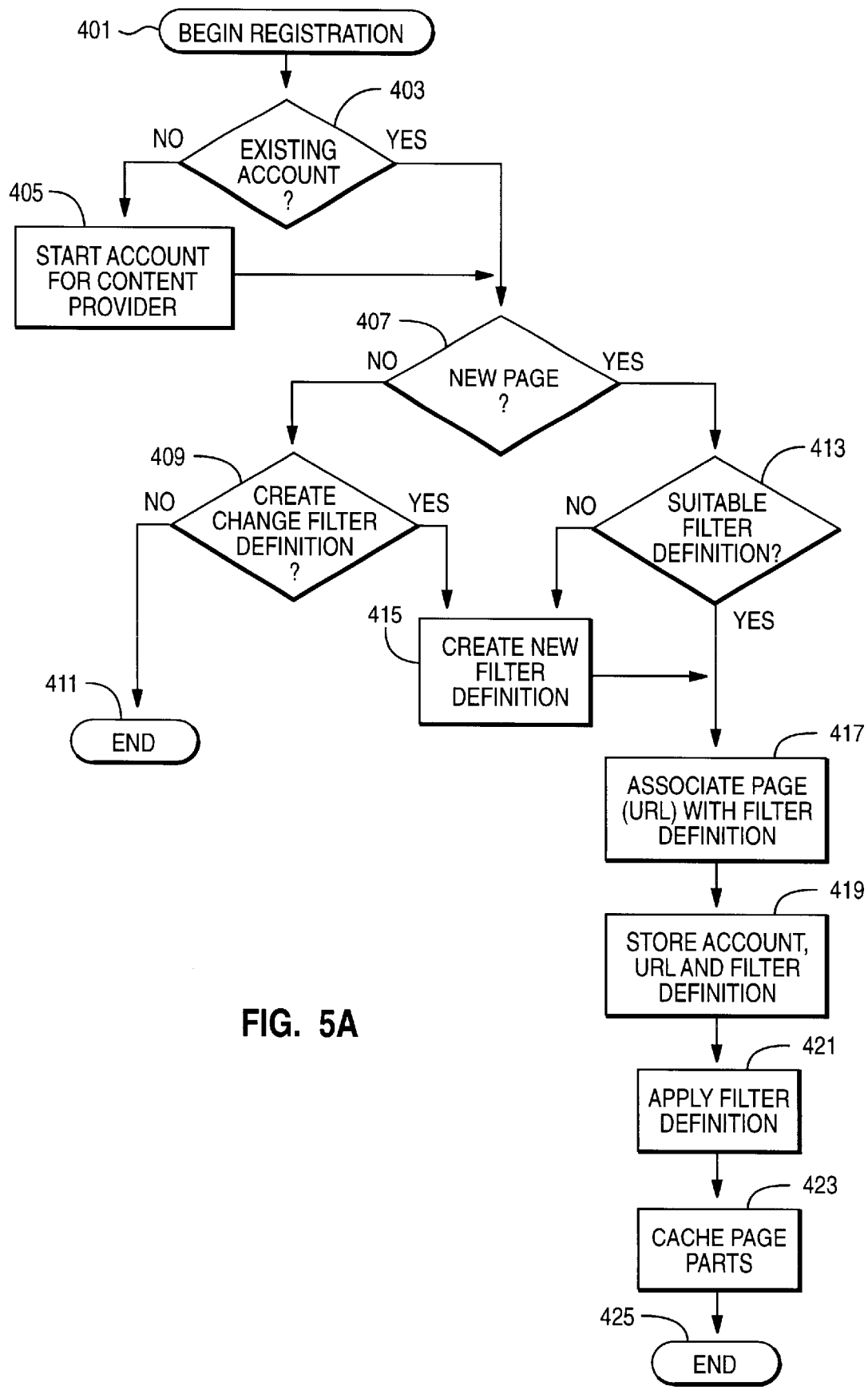
FIGS. 5A and 5B are more detailed flowcharts of a preferred method of the processes which occur at the hosting server.

The process by which a new page is registered into the hosting system is depicted in FIG. 5A. It begins in step 401, when a new page or some other registration action is detected. Step 403 determines whether the page is from an existing account, i.e. an existing web content provider web site. If not, a new account is started step 405. The account or folder is a convenient place to store filter definitions, policies and any transaction information which pertains to a particular content provider.

The test in step 407 determines whether it is a new page, either because of a new URL or new version, which has started the registration process. If it is not a new page, step 409, determines whether it is a request to create or change a filter definition which has started the registration process. For the purposes of this diagram, the policy for a content provider is considered part of the filter definitions although the information can certainly be kept in a separate file. The process will exit in step 411 if there is no filter definition to change.

In step 413, it is determined whether there is a suitable filter definition in the account folder for the content provider for the new page. As most pages in a web site share a common format and style, it is envisioned that a relatively small set of filter definitions can be used for all of the pages from a particular site. If there is no existing filter definition suitable, in step 415, a new filter definition is created for the page. There is more discussion on the creation of filter definitions and policies below in connection with FIG. 6.

In step 417, the page, i.e. URL is associated with the appropriate filter definition and in step 419 the appropriate changes to the account, URL and filter definition files are made. Optionally, the new page can be processed and cached as part of registration. Thus, in step 421, the filter definition is used by the pass through publisher to extract the desired portions of the page. In step 423, these portions of the page are cached for retrieval in the event of a client request. The process ends, step 425.

Figure 5B:
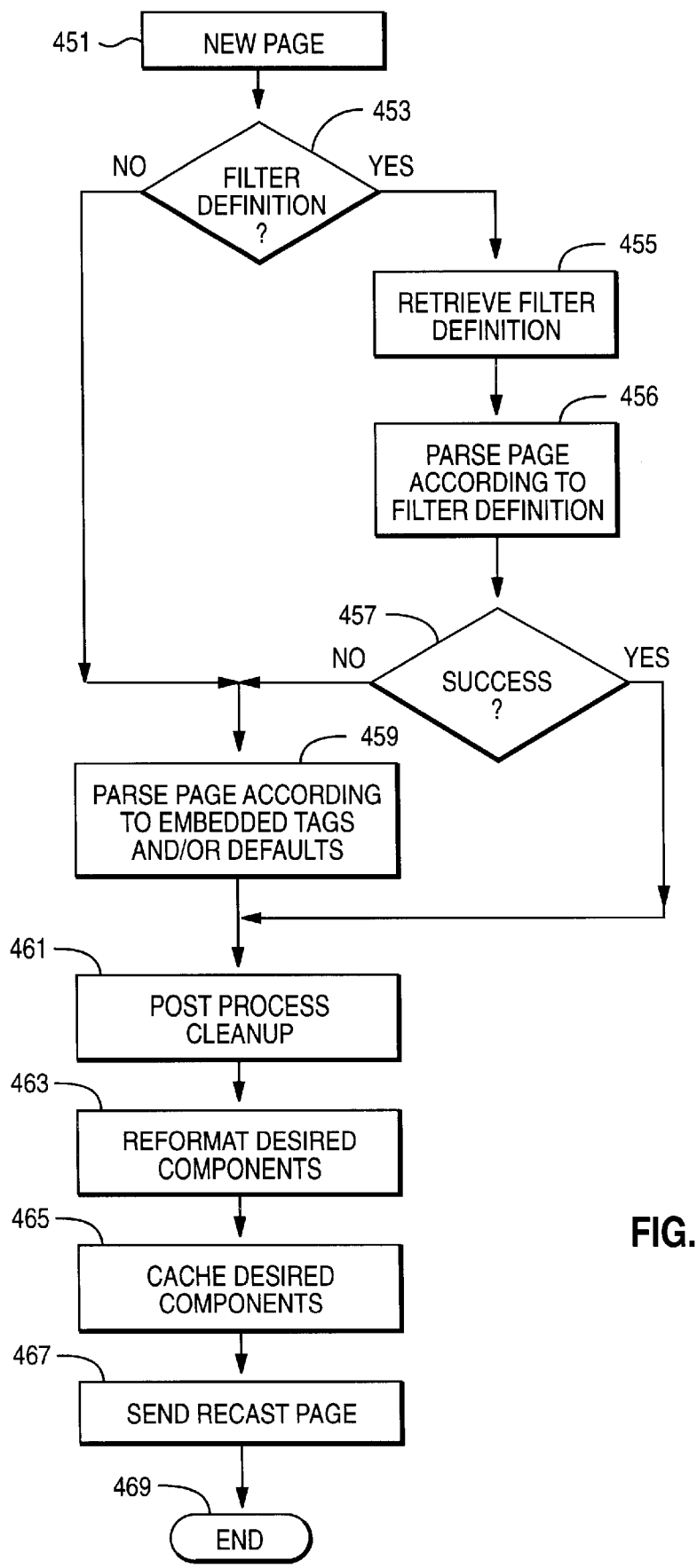

In FIG. 5B, the process for parsing and reusing web content by the pass through publisher is shown. When a client requests a new document from the pass through publisher at the hosting web site, the requesting web client information is recorded, and a request is made by the hosting web site to the content provider's web server on behalf of the requesting web client. The HTTP request to the web content provider server is similar to that which the requesting client could make to the content provider site directly, except with the hosting site as the originator. This assures that the web content server's log files record a visit by the requesting client which is essential for preserving the content provider's revenue stream.

As mentioned above, the hosting site preferably caches content likely to be requested by a client to improve the speed and reliability of the hosting web site pages. In this way, if the document has not changed since the pass through publisher last polled the site, it is retrieved from the local cache after registering the "hit" on the remote server. This reduces Internet bandwidth requirements and improves performance on both the hosting web server and the web content provider server.

However, for the process depicted in FIG. 5B, new content has been retrieved from the web content provider web server, step 451. Once the document content has been retrieved from the host provider, the filter database is searched for the appropriate filter definition, step 453, the filter definition kept for the web content provider. The information in the filter definition will help the pass through publisher parse the document structure of the web page, extracting the desired information. In step 457, a test is performed to determine whether the parsing was a success.

If a filter definition for the page or web content provider is not found, or the first attempt using the associated filter definition was not a success, the pass through publisher can fall back to a series of default filters which will assist in parsing the data, step 459. The hosting site will still be able to present the reformatted content, however, the process will not be as efficient as through an existing filter definition. This "best guess" approach utilizes several methods, including looking for common references to advertising engines, etc. As discussed below, the publisher can also look for a set of embedded tags indicating the desired content. Any document that a filter can not be found for can be logged, allowing staff to later create appropriate filter definitions. In practice, however, hosting sites employing the pass through technique will be able to define templates appropriate to all "rehosted" content. Most content provider sites employ a standard look and feel in their documents, allowing for filters that are appropriate for large numbers of documents found on a particular web site, if not every document on the entire provider web site.

These excerpted components are then run through the pass-through publisher's "post-processing" system to assure that they do not contain "dangerous" formatting code fragments that could adversely effect the hosting web site, step 461. For example, when articles are extracted from within a TABLE structure, HTML TABLE fragments could be left in the filtered HTML that could destroy formatting on the hosting web site. As another example, interactive or browser dependent scripting code could be found in the filtered HTML that may not make sense in the document's new context. The post filtering tasks should also include fixing any relative URLs embedded in the original web page to preserve their original function. Optionally, this can be accomplished by pointing the URLs to the hosting site for handling. For example, many documents are split into several pages by the web publisher. The link to the next part of the article can be translated to a hosting site link so that the next part is automatically served in the hosting site's context. The relative link could also be translated to an absolute link so that it will still lead to the content provider server even when selected in the recast page. As would be readily understood by those skilled in the art, these post filtering tasks could easily be performed by one of the filters, however, the applicants have found it to be convenient to separate the tasks thus simplifying the construction of the filter definitions.

The component HTML file, once extracted, separated, and post filtered is then reformatted into a new document in the style and context of the hosting web site, step 463. This is done by another component of the pass through publisher, a web publishing application that creates a "dynamic publishing template". The web publisher injects the excerpted content, titles, copyright statements and logos as received from the post filtering process. In step 465, the desired components are cached, which may include components useful in determining the version of a web page, but are not used in the recast page. In step 467, the recast page is sent to the requesting client. The process ends, step 469. Once presented by the requesting browser, the content of the hosting web site appears seamless to the user, although it may originate at a plurality of web content provider sites as well as the hosting site itself.

Since the code from the original content has been abstracted and separated from its style and formatting, it is now possible to format before sending it to the user in any of a variety of styles. This can prove useful in a variety of situations. It is common for the web sites of several smaller organizations to be "hosted" by an organization with the technical expertise and capital equipment allowing the smaller organizations to concentrate on creating the content for the web sites rather than the details of maintenance of the server machines. A single pass through publisher could provide a different look and feel for each of the different organizations hosted on its web servers. Alternatively, a single hosting web site could provide several different alternative formats. The choice of which format to present to a particular user could be based on the organization or location associated with the user. Alternatively, the web site could allow the user to choose from among the different formats based on a registration of his preferences in a user profile. Thus, the look and feel of a web site can change dependent upon the requesting audience.

The invention provides a mechanism which allows a hosting web site to provide a wide variety and great amount of third party Web content without incurring high licensing costs. Another benefit of the pass through system is in cost savings. Unlike a traditional system of licensing and republishing content, the hosting system does not require a large production staff since the republishing and re-styling of the content is automatic. A hosting system can provide a much faster production cycle and assure that the content does not quickly go "out of date".

A discussion of filter definition creation follows. The collection of document filters help the pass through engine understand the structure of a wide variety of web documents. The document filters can be created through several methods, including the analysis of the HTML source code, imbedded comments or delimiters and through comparisons with similar documents. Once the style of the web site is understood, a filter can be developed to look for the portion of the original document in which the hosting site is interested in reformatting. Inconsistencies in document style or structure can be neutralized by the use of custom code imbedded in the web page and detailed in the filter definition.

Figure 6A:
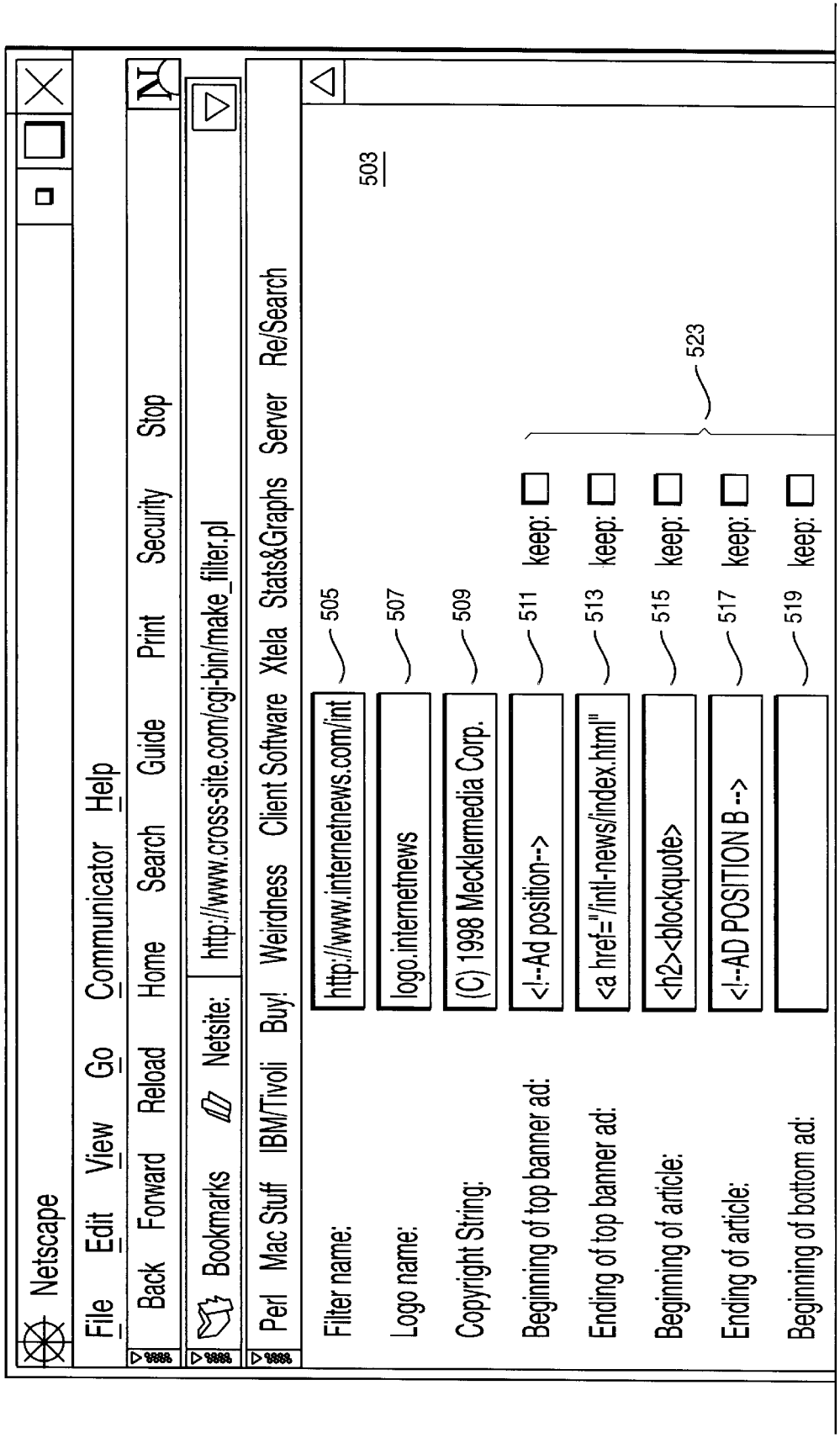
FIG. 6 is pictorial representation of a hosting filter definition interface.
Figure 6B:
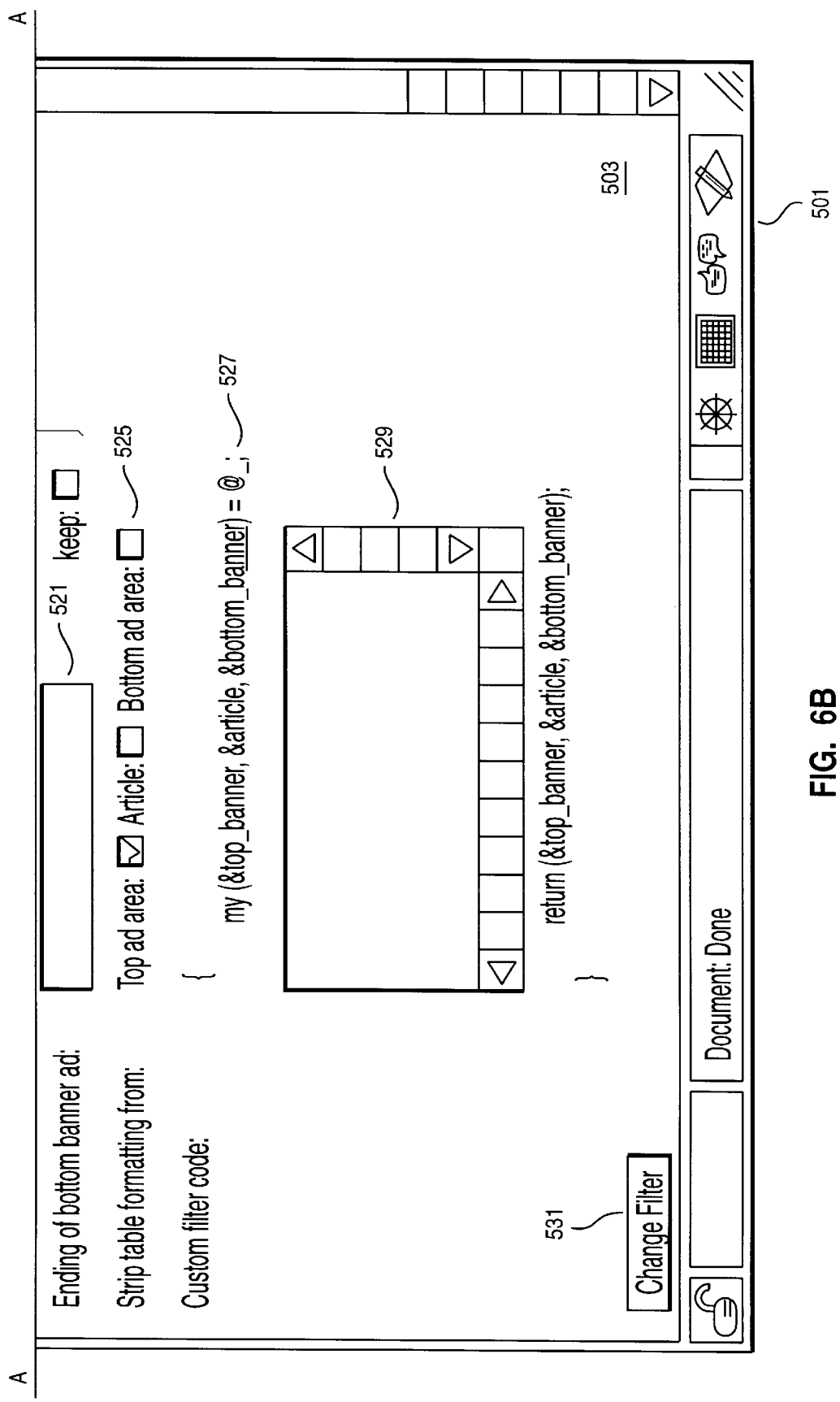

A CGI or other program can be used to create filter definition files. FIG. 6 shows a user interface in which tags or text can be entered manually so that the pass through publisher can more easily parse a web content provider's web pages. In the browser window 501, client area 503 contains a plurality of controls for a set of desired components. Entry fields 505, 507, 509, 511, 513, 515, 517, 519 and 521 are respectively used to enter the filter name, the logo name, a copyright string, a beginning of the top banner ad, the ending of top banner ad, the beginning of the article text, the ending of the article text, the beginning of the bottom ad and the ending of the bottom ad. Note that certain items such as logo name and copyright string could be replacements for those which occur in the web page, rather than indicators of the desired content.

A set of check boxes 523 allows the filter designer to indicate which of these items he wishes to keep on the recast page. The table stripping check boxes 525 indicate whether table formatting should be stripped from certain areas of the content provider's page. Custom filter code can be entered in field 527. Field 529 allows the entry of custom code for filtering code behaviors outside the predefined filters. Special cases can be accommodated by adding a function in Perl, Java, JavaScript or a specialized filter scripting language. Push button 531 allows the user to change to a different filter definition.

Each filter definition is stored in a filter definition database accessible by the pass through publisher. The publisher uses the filter definition to break the content into component parts: The title area, primary and secondary advertisements, and the content itself. The title area includes the title of the web page and is typically marked by HTML tags. The primary and secondary advertisements usually occur at the top and bottom of the web page, but may be located at different locations. They are typically marked in the HTML by tags or comments indicating an advertisement. Depending on various factors, such as the desired look and feel for the hosting web site, the cross-publishing agreement with the content provider, i.e. allowing for republishing certain types of web content but not others and the filter, the content may be very plain. A "bare bones" filter may strip out any extraneous links or "side bars" of information. Alternatively, the content may be a verbatim copy of a selected portion of the original web page.

In addition to providing the system with information on separating the components of the document, filter definitions also include publisher specific information such as the logo or copyright statements and policies that should be used by the pass through publisher when formatting the new version of the document.

Alternatively, the logo and copyright statements could be excerpted components like the title, ads and content.

The filter definitions can also include the "policy for a particular web content provider. Any number of policies can be established based on publisher, article, article section or any other distinguishing criteria that can be identified. Policies might govern whether content is licensed for use on an intranet, but not on the Internet, or vice versa, or both; how many times a document may be served off a host site; whether the publisher's ads should be passed through or not; what kind of caching strategy should be applied; what cost each view of the article carries for the host site; and so on. The specific types of policies available will depend on the context in which pass-through is being used, whether as a commercial product, integrated into custom solutions, or bundled with other products.

The client machine may be a personal computer such as a desktop of notebook computer, e.g., an IBM or IBM-compatible machine running under the OS/2® operating system, an IBM ThinkPad® machine, or some other Intel x86 or Pentium®-based computer running Windows '95 (or the like) operating system. Of course, the invention may be run on a variety of computers or collection of computers under a number of different operating systems. The computers on which the client software and the hosting and content provider web site reside could be, for example, a personal computer, a mini computer, mainframe computer or a hand held computer. Although the specific choice of computer is limited only by processor speed and disk storage requirements, it is typical that the client computer will be somewhat "lighter weight" than the web server computers. For example, computers in the IBM PC series of computers could be used a clients in the present invention. One operating system which an IBM personal computer may run is IBM's OS/2 Warp 4.0. For the web servers, the computer system might be in the IBM RISC System/6000 (TM) line of computers which run on the AIX (TM) operating system.

Figure 7:
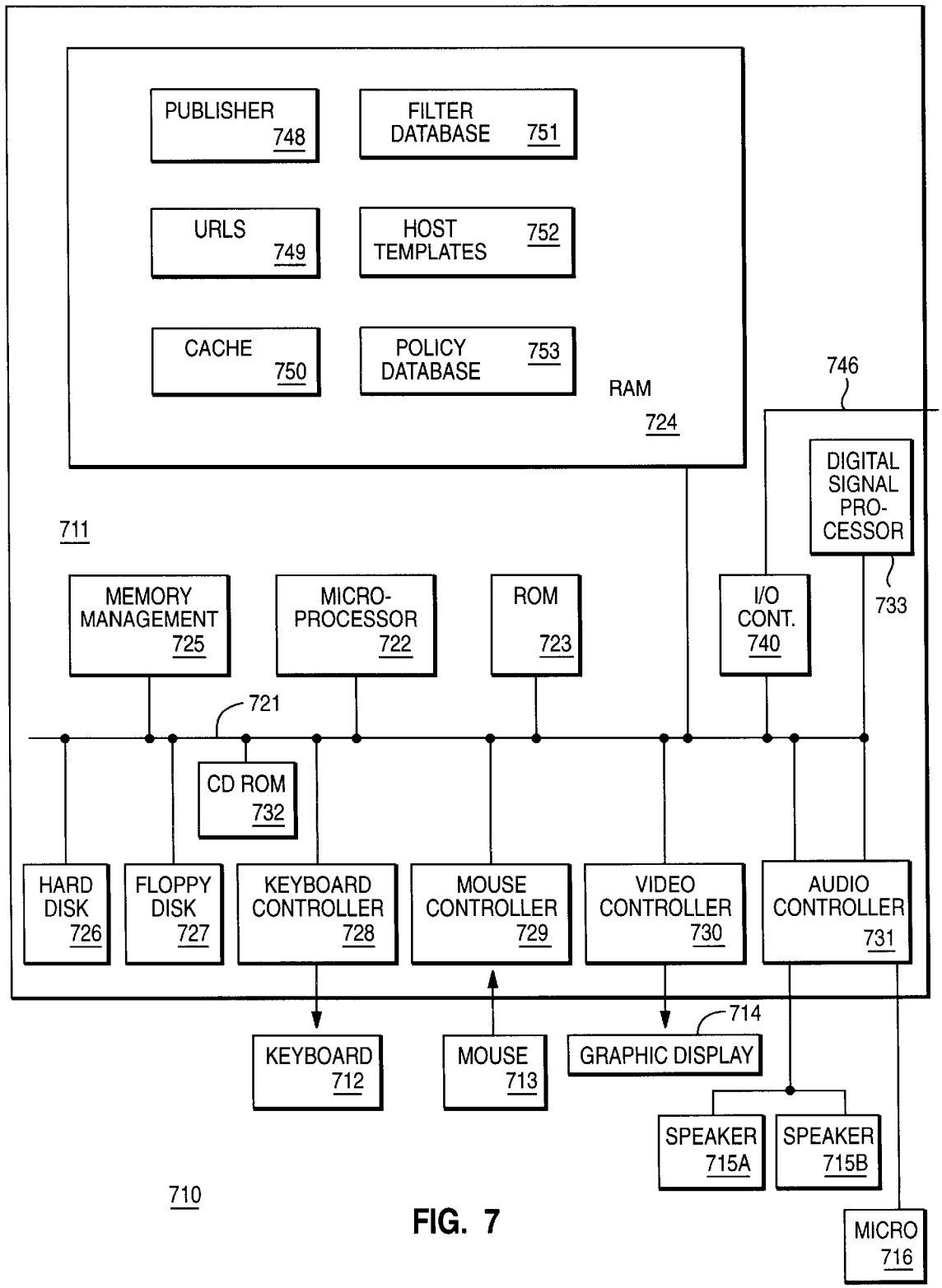
FIG. 7 is a block diagram of the major components of the data processing system unit on which the invention may be practiced.
Figure 8:
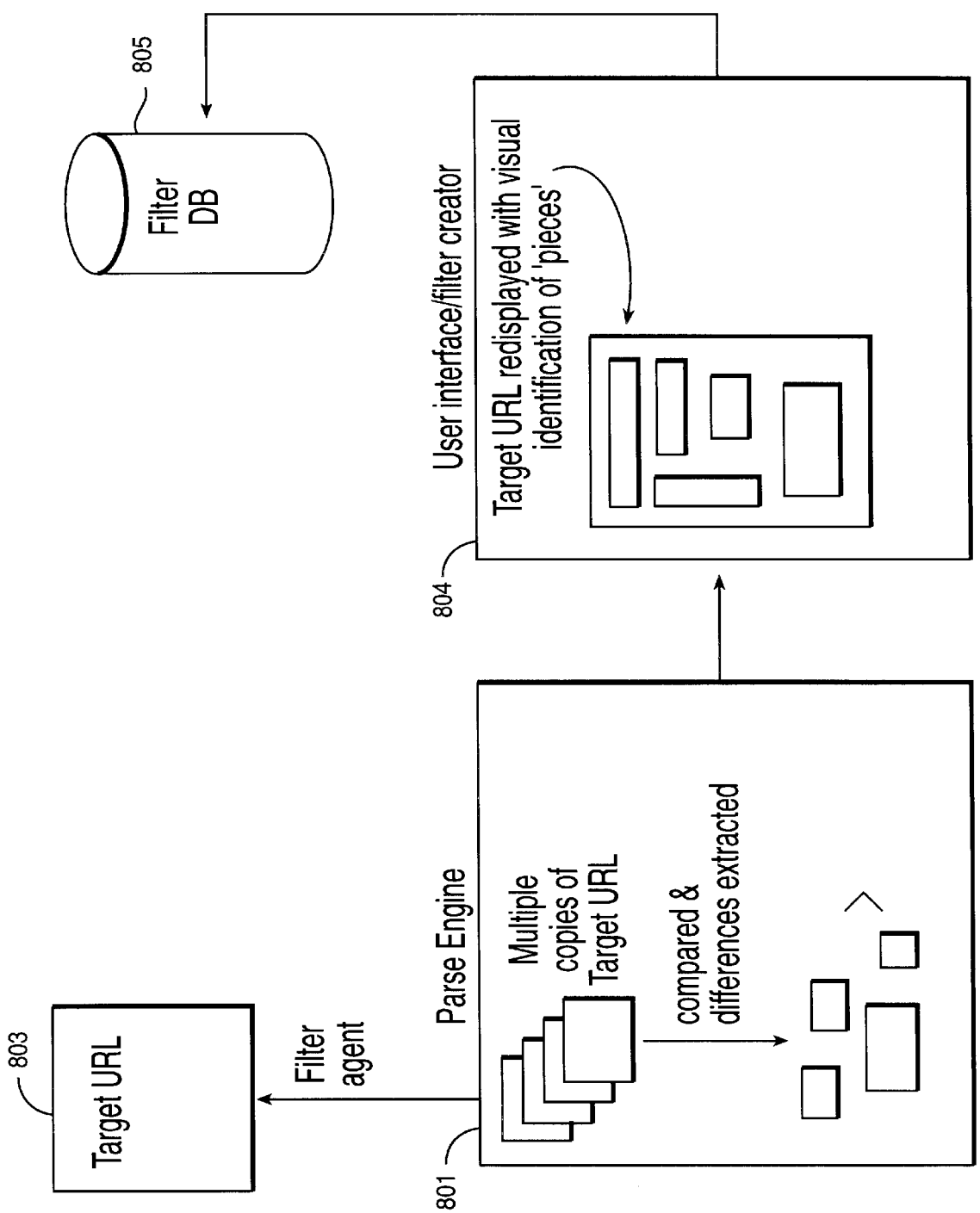
FIG. 8 is a diagram of a user interface based filter creation process for the present invention.

In FIG. 7, a computer 710, comprising a system unit 711, a keyboard 712, a mouse 713 and a display 714 are depicted in block diagram form. The system unit 711 includes a system bus or plurality of system buses 721 to which various components are coupled and by which communication between the various components is accomplished. The microprocessor 722 is connected to the system bus 721 and is supported by read only memory (ROM) 723 and random access memory (RAM) 724 also connected to system bus 721. A microprocessor in the IBM PC series of computers is one of the Intel family of microprocessors including the 386, 486 or Pentium microprocessors. However, other microprocessors including, but not limited to, Motorola's family of microprocessors such as the 68000, 68020 or the 68030 microprocessors and various Reduced Instruction Set Computer (RISC) microprocessors such as the PowerPC chip manufactured by IBM might be used by the present invention. Other RISC chips made by Hewlett Packard, Sun, Motorola and others may be used in the specific computer.

The ROM 723 contains among other code the Basic Input-Output system (BIOS) which controls basic hardware operations such as the interaction of the processor with the disk drives and the keyboard. The RAM 724 is the main memory into which the operating system and application programs are loaded. The memory management chip 725 is connected to the system bus 721 and controls direct memory access operations including, passing data between the RAM 724 and hard disk drive 726 and floppy disk drive 727. The CD ROM drive 732 also coupled to the system bus 721 is used to store a large program or amount of data, e.g., a multimedia program or presentation.

Also connected to this system bus 721 are various I/O controllers: The keyboard controller 728, the mouse controller 729, the video controller 730, and the audio controller 731. As might be expected, the keyboard controller 728 provides the hardware interface for the keyboard 712, the mouse controller 729 provides the hardware interface for mouse 713, the video controller 730 is the hardware interface for the display 714, and the audio controller 731 is the hardware interface for the speakers 715. An I/O controller 740 such as a Token Ring Adapter enables communication over a network 746 to other similarly configured data processing systems.

One of the preferred implementations of the invention is as sets of instructions 748–752 resident in the random access memory 724 of one or more computer systems configured generally as described above. Until required by the computer system, the set of instructions may be stored in another computer readable memory, for example, in the hard disk drive 726, or in a removable memory such as an optical disk for eventual use in the CD-ROM 732 or in a floppy disk for eventual use in the floppy disk drive 727. Further, the set of instructions can be stored in the memory of another computer and transmitted in a transmission means such as a local area network or a wide area network such as the Internet when desired by the user. One skilled in the art knows that storage or transmission of the computer program product changes the medium electrically, magnetically, or chemically so that the medium carries computer readable information.

Further, the invention is often described in terms that could be associated with a human operator. While the operations performed may be in response to user input, no action by a human operator is desirable in any of the operations described herein which form part of the present invention; the operations are machine operations processing electrical signals to generate other electrical signals.

As used herein, "Web client" should be broadly construed to mean any computer or component thereof directly or indirectly connected or connectable in any known or later-developed manner to a computer network, such as the Internet. The term "Web server" should also be broadly construed to mean a computer, computer platform, an adjunct to a computer or platform, or any component thereof. Of course, a "client" should be broadly construed to mean one who requests or gets the file, and "server" is the entity which downloads the file. Moreover, although the present invention is described in the context of the Hypertext Markup Language (HTML), those of ordinary skill in the art will appreciate that the invention is applicable to alternative markup languages including, without limitation, SGML (Standard Generalized Markup Language), dynamic HTML and XML (Extended Markup Language).

Moreover, while the preferred embodiment is illustrated in the context of a dialup network and the Internet, this is not a limitation of the present invention. The invention can also be implemented in an intranet environment where a large organization may have several content provider units which provide content for content using units which target different customer segments and have different trade identities. Thus, while the content using units may utilize much of the same information, each will want to recast the information in a different look and feel to project their own trade dress.

Filter Definition

As mentioned in incorporated by reference application, Ser. No. 09/113,678, entitled "Distribution Mechanism For Filtering, Formatting and Reuse of Web Based Content", there are many possible approaches to parsing filters for the invention. The invention discussed in this section is concerned with the automated creation of filter definitions for the distribution mechanism for a given set of Web pages.

For predictable sets of documents, a number of approaches are possible and more or less straight forward. It is possible for a user to generate a filter by coding or to use a program such as the CGI program discussed above with reference to FIG. 6. However, either approach requires sufficient research into the "typical" web page style or format at a given site. Given that a typical web page can contain 100 kilobytes of information, performing this manual comparison can be quite difficult, time consuming and error prone. Further, because the typical web site undergoes a continual renewal, changing content each day, manual comparison is probably not terribly practical in most situations. The present invention provides an alternative for filter definition for the distribution mechanism.

Figure 9:
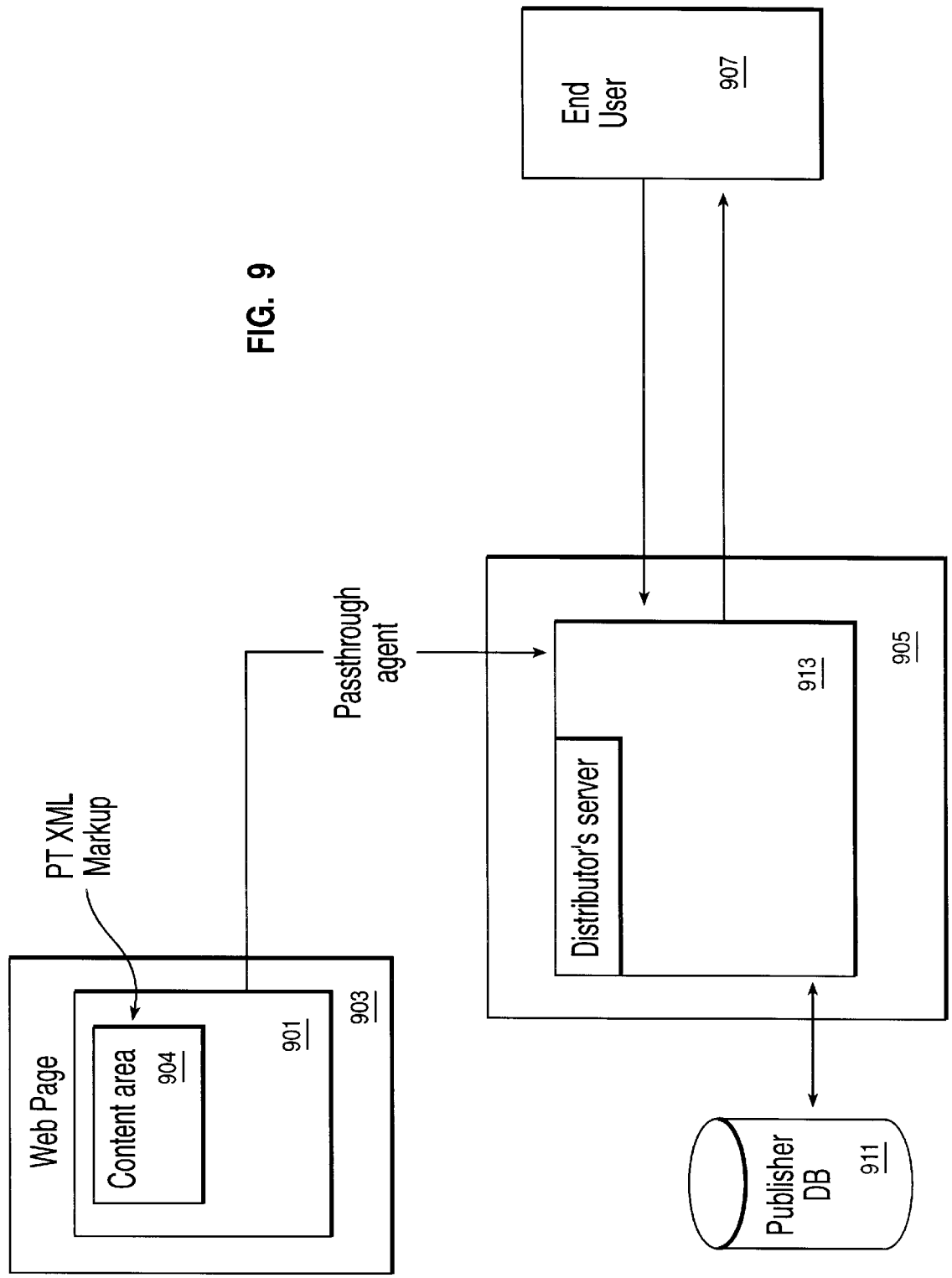
FIG. 9 is a diagram of policy based pass through distribution.

An overall diagram of the document parsing and filter creation process is shown in FIG. 9. The first step to creating a filter for a set of documents is to point the parsing engine 801 of the filter creation application at a representative member 803 of the type of documents for which the filter definition is intended through use of its URL. It is possible to generate a filter definition from a single page or from a collection of pages. Generating the filter from a single selected page is the preferred embodiment for a web site or section of a web site which is written in a consistent style. However, since a single page may not always be representative of the site or section as a whole, in some cases, it is preferred to use several pages to derive the filter definition. Because the hosting site is not generally interested in hosting all of the pages from the content provider web site, some sort of constraint is used to select the pages used to derive the filter. The constraint can be accomplished by indicating to the parsing engine to select a certain number of pages, e.g., five, from a particular path, e.g., www.news.com/news/*, or manually selecting several pages from the appropriate sections of the web site.

Alternatively, a starting page and certain number of traversals from the page can be given to select a group of pages so long as the travsersal stays within the pages controls by the web site. For example, the user gives the URL www.ibm.com/products/Aptiva and a traversal range of 3 to the parsing engine. This means that the parsing engine will select the initial page and pages on the www.ibm.com web site which are within three hyperlinks from the starting page to create the filter definition.

The parsing engine or its filter agent then retrieves from the URL a number of pages, varying the headers such as user-agent in its request each time, and stores the results of each retrieval. Even when using a single page to derive the filter, the headers are varied to reflect a representative sample of the types of browsers that would be expected to visit the source site. The purpose is to determine if any of the content on the page is created dynamically according to the type of client visiting the site. For example, content may change according to the manufacturer or version of the user's browser or its capabilities; advertising content may be selected based on domain; message text may vary according to time zone, IP address or other user environment information contained in the request headers. With a stored set of the contents of the URL, the parsing engine then compares each member of the set with the rest of the set, looking for differences and similarities. Similarities include portions of text, graphics or other content that do not vary each time the page or pages load. The similarities will be identified, as will portions of the page and pages that do vary in some way, i.e. the differences.

With these comparisons, the parsing engine 801 builds a topographical map of the data, which results in a description of the document's static and dynamic components. An article on a typical Internet news site would be an example of a static piece of content. It remains the same no matter who visits the site. Ad banners on the same type of site are the obvious example of dynamic content. Each visitor gets a different ad banner according to the advertiser's contract with the publisher.

In narrative form, the topographical map would read something like this: The document at URL X starts with static component A followed by a dynamic component B that ends at a static component C. This is followed by a further dynamic component D that ends at static component E. The description continues to the end of the document. One skilled in the art would recognize that there are a number of ways in which this data could be organized. One preferred data structure is given below.

Preferred data structure for textographical map:
Use XML tags to delineate begin and end of each 'chunk', embedded in the HTML source of a representative page, in the following form:
<PASSTHROUGH:CHUNK NAME="[chunk number]" TYPE="[DYNAMIC|STATIC]"> [html content] </PASSTHROUGH:CHUNK>
where [chunk number] is a number in a sequence that is incremented with the discovery of chunks in the page, i.e. 1, 2, etc., and TYPE is either DYNAMIC or STATIC. Note that this CHUNK tag will be replaced by a PASSTHROUGH XML tag that identifies the actual content of the chunk, once the user is done creating the filter . . . i.e. chunk 1 may become top_ad_banner.

This information is sent to the user interface builder 803 to present a representation of the page from which the user can select identified components to be passed through the filter and republished through the distribution mechanism.

The data of the static and dynamic components is then used to display a version of a representative document to the user. The actual presentation of the user interface could be performed at the hosting server, but would more typically be performed at a client machine associated with the hosting server. One of the documents used to derive the information can be arbitrarily selected for presentation. Preferably, the interface looks visually identical to the actual document, but is in fact a clickable diagram of the structure of the document. Borders can be presented around each element prior to and/or after selection to aid the user in understanding the boundaries of the component. The placement of the identified elements and the borders is straightforward task given the information present in the HTML of the page. Once the element is placed, a slight offset around the element can be used to place the border.

The interface determines whether each mouse click is located in one of the static or dynamic components of the document. If a mouse click is detected in an identified element, a border is drawn around that component, visually identifying it for the user. If there are already borders drawn, the selected element can be highlighted, e.g., change background or border color, in some manner. The user then assigns a label to that element such as "Article_text" or "top_ad_banner" or the like, and the element label or definition is then recorded in the database. A pop-up menu of element labels can be presented for this purpose. The user continues defining elements until he or she is done. Unused chunk information is discarded as irrelevant to the context of this filter.

Preferably, the label which the user used to identify the component is the identifier used by the template of the pass through distribution mechanism at the hosting site. As discussed above, the template is used to tell the pass through engine how the components of source pages are to be recast into the hosting site's pages. Alternatively, however, an additional step is possible wherein the user associates the label of the page element with the identifier used by the distribution mechanism.

As part of the parsing process, the parsing engine examines the tags associated with each of the elements. These tags tend to be common, even between page layouts which appear dramatically different. Thus, the parser 801 can provide a best guess as to what the appropriate label for the component would be. This can be accomplished by reference to a table in the parser which has a mapping of common HTML tags to element labels. This information can be passed to the user interface module 803. When a component is selected, the best guess label is presented to the user. This can be done by highlighting the best guess label in the pop-up menu of component labels described above. However, those skilled in the art would recognize that the contents of each identified component can differ greatly and that it may not be possible to meaningfully associate a set of tags with each type of component. Thus, the "best guess" of the filter definition parser, must, in the opinion of the inventors, be augmented by a human user, which is, of course, the point of having a user interface.

Next, the user defines the publisher associated with this URL and that is recorded in the database as well. Finally, the user specifies the pages or the URL pattern for which the filter should be used. By default, the filter will be used for the page or pages which were used to identify the component. However, the user may wish the filter to be used for a large section, if not all, of the documents from the web site. If the URL for the selected page is edited to remove the document portion or part of the path, a larger set of documents will be processed with the filter. One preferred means of indicating that the filter is to be used by any page from a given domain name is the use of a wildcard character. For example, www.domain1.com/news/*, where * is a wildcard character would indicate that any web page from the news section of the www.domain1.com domain was to be filtered using the just defined filter.

Once the filter definition and the scope of its use is defined, the filter definition is stored in a filter database 805 with other filter definitions to be used with pages from other domains.

Now that the process has been described, certain details of the data schema used in the preferred embodiment are discussed below.

In one preferred data schema, the fields for storing a filter in the pass-through database would be as follows:

URL—the URL of the document to be passed through this would normally be a partial URL that would match a number of documents, i.e. <http://www.publisher.com/news/articles* would match any URL that started with that string, such as <http://www.publisher.com/news/articles/ecommerce.html> http://www.publisher.com/news/articles/ecommerce.html CHUNK—each filter would contain an arbitrary number of component or element records, the structure of which is defined below.

PUBLISHER ID—this field would contain a numeric or alpha id that would refer to the publisher's entry in a separate database. The schema for this database is below.

POLICY ID—a publisher can have more than one policy associated with it, so it is necessary for the filter to associate itself with a publisher ID and policy ID as well. It would be a numeric id that pointed to a policy in the policy database.

Chunk (Element) Definitions
Each chunk would contain the following fields:

LABEL—the identifier for the element such as "Top_Banner_Ad" or "Article_Text" to be used when assembling final pass-through page.

START—the static data that signifies the beginning of this particular element.

START_N—the nth occurrence of START. For example, if START is "<IMGSRC=?/graphics/divider.gif?>" and START_N is 3, the chunk would start with the 3rd occurrence of the START text found in the document. The default value is 1.

KEEP_START—is a Boolean filed to instruct the pass through mechanism to keep or discard START text as part of the component.

END—is the static data that signifies end of component.

END_N—nth occurrence of END is relevant as it identifies the instance of the landmark to use as the end of the element. For instance, there may be several end of table cell tags (</TD>) in a given component, and the fifth such tag encountered should be considered the end of the component in question.

KEEP_END—is a Boolean to keep or discard END text as part of the component.

SPECIAL—contains the name of custom post-processing code to which to feed the component.

The SPECIAL field exists to provide for future adaptation or unforeseen difficulties. If, for example, a source site begins using other XML tags in their HTML pages that are being passed through, those XML tags are ending up in components that are being extracted and those XML tags are interfering with the layout of the final assembled page, a SPECIAL field could be used to add a Perl or Java filter that strips those specific XML tags from the extracted components.

In one preferred embodiment, each entry in the Publisher Database would contain the following fields:

| | |
|---|---|
| ID | unique numeric identifier of the filter. |
| NAME | Publisher's business name. |
| URL | URL of the publisher's site. |
| LOGO | binary file to be included on pages passed through from the publisher's site and linked with the URL. |
| CONTACT | name, phone, and e-mail address of contact person for pass through. |
| POLICY | numeric ID of policy set that pertains to this publisher's content in Policy Database. |

Although the filter definition process was explained in the context of the overall pass through mechanism, the filter definition is useful in other circumstances where web content is filtered, allowing selected components of the filtered web pages to be reused for other purposes. For example, a similar filter can be used a means to rejuvenate the look and feel of a web site to a new format. The selected content from old pages would be recast into new pages, all at the web content provider's web site and distributed directly through calls to the native web site, rather than through the pass through distribution mechanism.

Policy in the Distribution Mechanism

All the various components of the pass-through mechanism are preferably tied together and overseen by sets of rules or policies defined for or by each publisher or web content provider. In one preferred embodiment, these policies are kept at the hosting server in a 'publisher database' which represents a collection of information regarding every aspect of the data sources as they pertain to the pass through distribution mechanism.

Understandably, as the content developed by the web content provider represents a great deal of intellectual capital, the provider will be interested in specifying control of the pages. Through the use of the policy database, the hosting server can comply with policies specified by the web content provider as to who is allowed to see what when. For example, the web content provider may wish to restrict republication of his data according to the origin of the requesting client. Some publishers will allow all of their content to be disseminated widely throughout the Internet so long as they receive advertising income from the ad hit counter. Other publishers will wish to restrict distribution of the web content within an intranet or extranet or to certain IP addresses. Further, it is possible to specify which portions of the database can be seen by a specific class of user. For example, the web content provider may allow text in an article to be recast and redistributed by the pass through mechanism to anyone requesting it in the Internet. However, the provider may wish to restrict a graphic to a certain specified group of users because of the effort required to produce it. Yet further, the web content provider may be willing to allow the hosting site to recast its content at a certain time lag, thus preserving an advantage for presenting the very latest material at its own site. While this may not be preferred from the standpoint of the hosting site, still the delayed content is better than no content whatsoever, and certainly at a much lower expenditure of time and effort than writing a page from scratch. Still further, a web content provider may have multiple policies for the web site, one policy for a respective set of web pages and a second policy for a second respective set of pages.

The mechanisms by which the invention enforces these and other policies are described below. As shown in FIG. 9, a web page 901 resident in a web content provider web server 903 has been requested by the hosting server 905 as the result of an HTTP request by a web client 907. In the diagram, a special XML tag 909 is included in the HTML which makes up the page which specifies or otherwise identifies the appropriate policy. This XML tag 909 defines the boundaries of the data for which the policy applies, the identity of the data and may also contain policy data for the data. The policy data can include information such as cost of recasting/redistribution, access privileges and copyright information. Alternatively, it may simply be a policy ID for the appropriate policy in the policy database 911 coupled to the hosting server 905. Although only a single tag is shown in the figure, multiple tags can be present, each specifying a respective, possibly different, policy for the web page data it respectively protects.

Once the web page 901 is retrieved by the pass through agent 911 at the hosting server 905, the XML tag is identified through the parsing process. The data boundaries, data ID and policy data are extracted and are used to assemble the recasted page. If a policy ID is specified, the corresponding policy is retrieved from the policy database. Alternatively, if no policy is specified in the tag, the URL from which the web page was retrieved is used to retrieve the appropriate policy. The policy data, both from the tag and from the policy in the policy database, is used to determine whether the hosting site has permission to recast the web page to the requesting client. The client specific data which is included in the client request such as IP address is matched against the policy for web data or publisher. Other types of client specific data include client operating system, browser manufacturer and version, browser capabilities, e.g., JavaScript, StyleSheets, domain and the referer document which indicates the source URL from which the link originated. If the client specific data is not contained in the initial request, the hosting server can make a query to the client for the needed data, e.g., authentication.

If there is a conflict between the general policy for the web site stored in the policy database and the policy data contained in the XML tag, the policy data in the XML tag overrides the general policy for the tagged data. This allows the web content provider finer control of particularly valuable web data while permitting a general policy which applies for the majority of its data. The policy data from the XML tag may be stored in the policy database for archival, accounting or other purposes. For example, the hosting site may be contractually required to show the web content provider that the recast web content was distributed according to the policies set by the web content provider.

If the requesting client is permitted the web content, the hosting server recasts the web content as described above. Namely, the pass through mechanism excerpts the desired information from the web page and recasts the information according to the preferred format of the hosting site.

In the recasting process, the policy data in the XML tag may be consulted. It could potentially contain instructions on how to format the tagged data. For example, when an up-to-date version of a graphic or article can not be displayed, the policy may have instructions for the hosting server to retrieve, via another HTTP request or using a previous cached version, a back level version of the graphic or article. For example, the policy could contain an instruction to insert a link in the recast page together with text indicating that "This information is delayed by three hours. For a more up-to-date version, please click here." The link could bring the user to the web content provider web site.

In an alternative embodiment to that described above, a finer degree of control for respective components of the web page is possible without the use of the special XML tags. However, for a given page, a certain amount of coordination between the filter definition and the policy in their specific databases is required. As noted above, the filter definition preferably contains a reference to the appropriate policy for a section of the web site from which the web page originated. The policy retrieved may specify different treatments for the respective selected components of the filter definition. Thus, each component can be said to have its own policy. When a specific component on a specific page needs special treatment, a filter definition for that specific page can be developed and used in the pass through distribution process. Alternatively, the filter can reference several policies and indicate which apply to respective selected components.

The publisher database in one preferred embodiment actually comprises two databases: one with basic publisher data, another that defines policies that pertain to the publisher's content. In this embodiment, the schema for the databases look like this:

Basic Information

| | |
|---|---|
| ID | unique numeric identifier |
| NAME | publisher's company or dba name |
| URL | URL for their web site |
| CONTACT | contact person information (Name, phone number, e-mail) |
| POLICIES | list of policies by id that pertains to the publisher's content. |
| COPYRIGHT | text to append to each page passed through |
| LOGO | image or link to image to place on passed through pages, blank if no logo is to be displayed. |

Policy Records

| ID | unique numeric id |
|---|---|
| URL | (portion of URL to match, e.g., http://news.webahead.ibm.com/news) |
| NUMBER | e.g., −1 for no limit, 0 or more for quota |

OF PAGE VIEWS
CACHE TYPE 0 no cache, 1 cache entire document, 3 cache named chunks
CACHE CHUNKS names of fields that should be cached, i.e. "BODY" or "ARTICLE"
DISTRIBUTE 0 single or specified sites, 1 intranet, 2 extranet, 3 universal
COST PER VIEW in dollars, 0 for no accounting charge
MIN AGE invalidates request unless document is at least a given age old. Attribute would direct hosting site to alternate content, e.g., <MIN_AGE=5_HOURS, ALT= "oldversion.html">
ATTRIBUTION Includes link, logo and attribution text to be added at the bottom of a recast web page or selected component.

Those skilled in the art will appreciate that other schemas are possible for storing the policy information. For example, the schema above assumes that a single policy will suffice for all the elements in a page which are retrieved by a single HTTP request. This will generally work since the elements which are likely to require different policies, text vs. graphics, are generally called by separate HTTP calls and so can have separate policy IDs. However, in the alternative, rather than have the policy IDS associated with a given URL, they can be associated with a specific content element to specify different policies for respective components of a given web page.

In one preferred embodiment, if a filter definition did not call out a specific policy ID, then a default policy definition would be used. This definition, rather than ascribing to the special preferences of a particular web content provider, would follow the needs of the hosting site. Generally, it would have no limit on the number of views of a page a user could request nor would have any limitation on the type of requesting client who could receive the page. Caching would be performed as was most efficient for the hosting site to give the best apparent speed to the requesting user.

Figure 10:
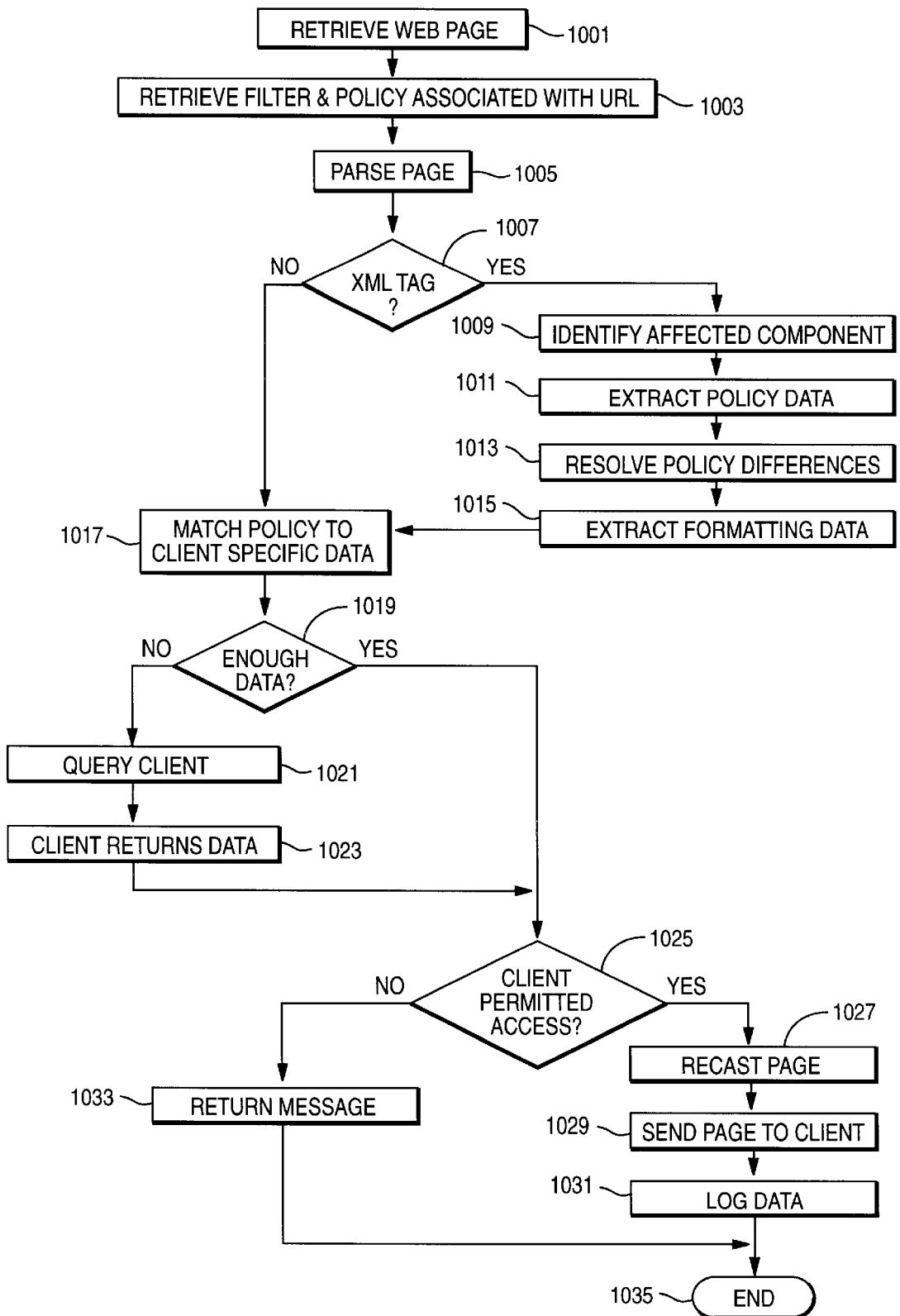
FIG. 10 is a flow diagram of one preferred embodiment of policy based passthrough distribution.

The flow diagram depicted in FIG. 10 illustrates the process discussed above. In the illustrated process, it is assumed that the client has made a request to the hosting site for a pass through document, i.e. a web page from a web content provider rather a native page stored at the hosting site. In step 1001, the web page is retrieved by the hosting site. Each request for a pass through document will cause a search in the filter and policy databases for records which match the URL or main portion thereof of the retrieved web page. When such records are found, they are retrieved, step 1003. As discussed above, the filter definition and policy contain information such as the publisher's id, the filter id and the policy id and associated data for the web page. The filter definition is used to parse the web page for the selected components which will be recast by the hosting site. In addition, the parsing step 1005 looks for the special XML tag discussed above.

If the XML tag is found, step 1007, additional processing occurs. In step 1009, the tag is used to identify the affected component within the web page and the boundaries of the component. In step 1011, the policy data associated with the affected component is extracted and processed. In step 1013, any policy differences between the policy detailed in the tag and the policy definition from the policy database are resolved. In the preferred embodiment, they are typically resolved as specified by the tag. In step 1015, any special formatting data in the tag is extracted for future use.

The data in the policy definition is matched against the client specific information associated with the client request, step 1017, and is used to test to see if the pass through distribution should be allowed. In step 1019, a test is performed to determine whether there is enough client specific data to determine whether the client request should be fulfilled. If not, in step 1021, the client is queried for the needed data. In step 1023, the client returns the client specific data required. The test in step 1025 determines whether the requesting client should be permitted access, i.e. whether the pass through distribution should take place. If so, in step 1027, the selected components are extracted from the web page according to the filter definition, the extracted information is formatted according to the hosting site's template and any additional formatting information in the tag or policy definition. In step 1029, the recast web page is sent to the requesting client.

The logging step 1031 can vary greatly in complexity depending on the particular implementation of the invention and the policy associated with the web page. As mentioned above, there may be a cost associated with distributing the web page. Thus, there needs to a log of the transactions which can be associated with particular requesting clients, or the hosting site itself, so that these fees can be assessed accurately. Also, as noted above in the policy definition schema, there may be a limited number of times that particular web data may be viewed through the pass through mechanism before the requesting client is requested to access the data directly from the web content provider's web site. Logging the number of times that a client has requested the data facilitates an additional test, e.g., as part of step 1025, to determine whether the client can receive the data through the pass through mechanism.

As shown in the policy definition schema, the policy for a given web content provider may specify whether the data from the web content provider's site can be cached at the hosting site. As mentioned above, caching at the hosting site greatly improves the perceived performance of the pass through distribution mechanism. However, some web content providers may not wish the hosting site to cache their data. The policy can also specify specific caching policies as to how long and what type of data may be kept in the cache for the particular publisher. Thus, if specified by the caching policy, certain components of the web page may be cached in the logging step.

As mentioned above, it is possible that the publisher will have multiple policies for specific sections of the web site. Preferably, the sections will be organized such that a URL can be used to select the correct policy. For example, the news section, e.g., www.domain1.com/news, will be passed through, but the product section, www.domain1.com/products, will not be. The portion of the URL, which specifies the actual page, after the main portion is ignored in the matching step. However, some sites may not be well organized and it could be of potential interest to log the policy and filter definition used with each transaction as a means for taking future corrective action. If an XML tag was defined and embedded in the page to specify which policy should be used, a tag ID can be logged as well.

The pass through mechanism can be configured a stand alone server software product. This would resemble a proxy server and would serve two purposes: it would help the speed issue by devoting more resources to the hosting activity, and it would allow the servicing of several hosting web sites from a single server.

The invention solves several business and technical problems. It provides an attractive mechanism to obtain permission to reprint Web-based content with little or no licensing fees. Since the original publisher's transaction records are preserved, their existing revenue base is maintained through the number of ad impressions counted. Since the ad impressions are now also occurring on the hosting web site with very little work on the part of the original publisher, the revenue is very likely to be increased. Thus, increased traffic is generated for both the hosting web site as well as the content provider's site with very little manual intervention after configuration.

The invention is very flexible and is easily configured to accommodate a wide variety of web content. Through the use of document templates, filters and policies, the invention allows simple modification of these elements to tailor them to any number of different content providers' formats and document templates. Once the hosting web server has been configured for a set of content providers, the production staff necessary to republish articles is minimal. Content can be extracted without the content provider web site modifying content to a special format or installing special purpose software. Articles in the hosting web site are automatically synchronized with those in the content provider as changes are made at the content provider web site (so long as noncached material is used). By abstracting the content from any particular content provider site and reformatting the content to the hosting site's format a consistent look and feel is maintained.

In one preferred embodiment of the invention, the hosting web server caches content locally to speed delivery to the requesting client and minimize dependency on the content provider web site. In other embodiments of the invention, unauthorized requests are blocked, eliminating a potential avenue for abuse of the system and copyright violation.

In the attached appendix, examples are given of a content provider's original web page, the template in which in hosting site inserts the excerpted desired content and the resulting recast page with comments. These examples will help the reader more fully understand the principles of the present invention.

APPENDIX

Original Content Provider HTML:
IBM Global Services
<http://www.ibm.com/services/articles/whatwedo.html>What we can do for
you<http://www.ibm.com/services/business/>Viewpoints<http://www.ibm.com/ser
vices/career/>Careers<http://www.ibm.com/services/business/feature.html>Case
Studies<http://www.ibm.com/services/pressrel/>News<http://www.ibm.com/servi
ces/navtools/otherservices.html><http://www.ibm.com/Search>Search
<http://www.ibm.com/services/profservices/index.html>Professional
Services<http://www.as.ibm.com/>Product Support
Services<http://www.ibm.com/globalnetwork/>Network
Services<http://www.ibm.com/services/ourportfolio.html>Our Portfolio
IBM Announces New e-business Services for Security
Builds on popular packaged e-business services offerings
March 24, 1998
BOSTON, Massachusetts, March 24, 1998 . . . IBM today announced new global
security services that build on the company's portfolio of e-business services
introduced last October. IBM's e-business offerings help business use networks
and Internet technologies to more securely buy and sell on the Web and improve
internal and external communication. IBM made these announcements at Internet
Commerce Expo.
<../ebus/security.html>IBM Security Services help customers of all sizes
assess
and improve security in their computing environments. They address exposures
across operations, including policy and management systems, applications,
networks, systems and physical site security. IBM has the unique capability as
a security services provider to give customers a choice of individual
offerings or a comprehensive, end-to-end security solution.
. . .
*IBM is a registered trademark of International Business Machines Corporation
<http://www.ibm.com/> IBM Homepage <http://www.ibm.com/Orders/> Order
<http://www.ibm.com/Assist/> Contact IBM
<http://www.ibm.com/IBM/Employment>
Employment <http://www.ibm.com/Privacy/> Privacy <http://www.ibm.com/Legal/>
Legal
The Hosting Site Web Page Template
Home
<http://dev2.cross-site.com/apps/top.map> Need Help? Click on the '?'
<http://dev2.cross-site.com/apps/side.map> Need Help? Click on the '?'
<http://dev2.cross-site.com/cs/?section=News&text=news/news.html>News |
<http://f2.dejanews.com/crosssite/>Forums |
<http://dev2.cross-site.com/cs/?section=Columns&text=columns/columns.html>C
olumns |
<http://dev2.cross-site.com/cs/?section=Resources&text=resources/resources.
html>Resources |
<http://dev2.cross-site.com/cs/?section=Downloads&text=downloads/downloads.
html>Downloads |
<http://dev2.cross-site.com/cs/?section=Cross-Site&text=about/about.html>Abo
ut |
<http://dev2.cross-site.com/cs/?section=Products&text=products/products.htm APPENDIX-continued

```
l&sidebar=products/sidebar.html>Products |
<http://dev2.cross-site.com/cs/?section=Employment&text=employment/employmen
t.html>Employment
<http://dev2.cross-site.com/cs/?sidebar=home/sidebar.html>Home |
<http://dev2.cross-site.com/cs/?section=Search&text=sitesearch/search.html&t
itle=Search&logo=logo.crosssite>Search |
<http://dev2.cross-site.com/cs/?section=Mail&text=mail/mail.html>Email |
<http://dev2.cross-site.com/cs/?section=Contact&text=about/contact.html>Cont
act
| <http://dev2.cross-site.com/cs/?section=Help&text=support/help.html>Help
(C)1998 Tivoli Systems
The Recast Web Page (including comments):
(The parsing engine extracted this code from the URL):
<IMG SRC="http://www.ibm.com/services/images/animh.gif" alt="IBM Global
Services" WIDTH=584 HEIGHT=54 BORDER=0><br>
<TABLE WIDTH=584 CELLSPACING=0 CELLPADDING=0 BORDER=0>
<TR><TD><NOBR><A
HREF="http://www.ibm.com/services/articles/whatwedo.html"
TARGET=_top><IMG SRC="http://www.ibm.com/services/images/foryou3.gif"
ALT="What we can do for you" WIDTH=145 HEIGHT=18 BORDER=0></A><A
HREF="http://www.ibm.com/services/business/" TARGET=_top><IMG
SRC="http://www.ibm.com/services/images/viewpt3.gif" ALT="Viewpoints"
WIDTH=81 HEIGHT=18 BORDER=0></A><A
HREF="http://www.ibm.com/services/career/" TARGET=_top><IMG
SRC="http://www.ibm.com/services/images/careers3.gif" ALT="Careers"
WIDTH=67 HEIGHT=18 BORDER=0></A><A
HREF="http://www.ibm.com/services/business/feature.html" TARGET=_top><IMG
SRC="http://www.ibm.com/services/images/casestdy3.gif" ALT="Case Studies"
WIDTH=90 HEIGHT=18 BORDER=0></A><A
HREF="http://www.ibm.com/services/pressrel/" TARGET=_top><IMG
SRC="http://www.ibm.com/services/images/news3.gif" ALT="News" WIDTH=52
HEIGHT=18 BORDER=0></A><A
HREF="http://www.ibm.com/services/navtools/otherservices.html"><IMG
SRC="http://www.ibm.com/services/images/countrysites.gif" WIDTH=87
HEIGHT=18 BORDER=0></A><A HREF="http://www.ibm.com/Search"
TARGET=_top><IMG
SRC="http://www.ibm.com/services/images/search3.gif" ALT="Search"
BORDER=0></A></NOBR></TD></TR>
</TABLE>
(It then inserted the code into the hosting site's template, thusly:)
<CENTER>
<TABLE BORDER=0>
<TR>
<TD>
<IMG SRC="http://www.ibm.com/services/images/animh.gif" alt="IBM Global
Services" WIDTH=584 HEIGHT=54 BORDER=0><br>
<TABLE WIDTH=584 CELLSPACING=0 CELLPADDING=0 BORDER=0>
<TR><TD><NOBR><A
HREF="http://www.ibm.com/services/articles/whatwedo.html"
TARGET=_top><IMG SRC="http://www.ibm.com/services/images/foryou3.gif"
ALT="What we can do for you" WIDTH=145 HEIGHT=18 BORDER=0></A><A
HREF="http://www.ibm.com/services/business/" TARGET=_top><IMG
SRC="http://www.ibm.com/services/images/viewpt3.gif" ALT="Viewpoints"
WIDTH=81 HEIGHT=18 BORDER=0></A><A
HREF="http://www.ibm.com/services/career/" TARGET=_top><IMG
SRC="http://www.ibm.com/services/images/careers3.gif" ALT="Careers"
WIDTH=67 HEIGHT=18 BORDER=0></A><A
HREF="http://www.ibm.com/services/business/feature.html" TARGET=_top><IMG
SRC="http://www.ibm.com/services/images/casestdy3.gif" ALT="Case Studies"
WIDTH=90 HEIGHT=18 BORDER=0></A><A
HREF="http://www.ibm.com/services/pressrel/" TARGET=_top><IMG
SRC="http://www.ibm.com/services/images/news3.gif" ALT="News" WIDTH=52
HEIGHT=18 BORDER=0></A><A
HREF="http://www.ibm.com/services/navtools/otherservices.html"><IMG
SRC="http://www.ibm.com/services/images/countrysites.gif" WIDTH=87
HEIGHT=18 BORDER=0></A><A HREF="http://www.ibm.com/Search"
TARGET=_top><IMG
SRC="http://www.ibm.com/services/images/search3.gif" ALT="Search"
BORDER=0></A></NOBR></TD></TR>
</TABLE>
</TD>
</TR>
</TABLE>
</CENTER>
<A NAME="#TOP"></A>
<FONT SIZE="+1" COLOR="#000099" FACE="Arial, Helvetica">
<B>News<B>
</FONT>
<!-- START TOP NAV BUTTONS -->
```

APPENDIX-continued

```
<TABLE CELLPADDING=0 CELLSPACING=0 BORDER=0 WIDTH=100%>
<TR ALIGN=RIGHT VALIGN=TOP>
<TD BGCOLOR=FFCC33 ALIGN=RIGHT VALIGN=CENTER BORDER=0
WIDTH=100% COLSPAN=2>
<A HREF="http://dev2.cross-site.com/apps/top.map">
<IMG NAME="topbuttons" HEIGHT=35 WIDTH=175
SRC="http://dev2.cross-site.com/images/topbuttons.gif"
BORDER=0 ALT="Need Help? Click on the '?'" ISMAP ></A>
</TD>
</TR>
<!-- END TOP NAV BUTTONS -->
(Similarly, the template has this insertion spot for the article from the
content provider's document:)
<TABLE BORDER=0>
<TR>
<TD>
</TD>
</TR>
</TABLE>
(Into which the extracted article is inserted:)
<H3>
IBM Announces New e-business Services for Security
    <BR><SMALL>Builds on popular packaged e-business services
offerings</SMALL>
</H3>
<P><B>March 24, 1998</B></P>
<P>BOSTON, Massachusetts, March 24, 1998 . . . IBM today announced new global
security services that build on the company's portfolio of e-business
services introduced last October. IBM's e-business offerings help business
use networks and Internet technologies to more securely buy and sell on the
Web and improve internal and external communication. IBM made these
announcements at Internet Commerce Expo.
<p> <a href=../ebus/security.html>IBM Security Services</a> help
customers of all sizes assess and improve security in their computing
environments. They address exposures across operations, including policy
and management systems, applications, networks, systems and physical site
security. IBM has the unique capability as a security services provider to
give customers a choice of individual offerings or a comprehensive,
end-to-end security solution.
. . .
<BR>
</FONT>
</TD>
</TR>
</TABLE>
(The end result is a unified HTML document with elements from the
publisher's page inserted into the host site's template to create a
seamless whole.)
```

While the invention has been shown and described with reference to particular embodiments thereof, it will be understood by those skilled in the art that the invention can be practiced, with modification, in other environments. For example, although the invention described above can be conveniently implemented in a general purpose computer selectively reconfigured or activated by software, those skilled in the art would recognize that the invention could be carried out in hardware, in firmware or in any combination of software, firmware or hardware including a special purpose apparatus specifically designed to perform the described invention. Therefore, changes in form and detail may be made therein without departing from the spirit and scope of the invention as set forth in the accompanying claims.

We claim:

1. A method for defining a filter used to extract web content for a web page wherein the extracted content is used in a recast web page produced by a hosting site, comprising the steps of:

retrieving multiple versions of at least one original web page from a content provider web server;

parsing the multiple versions of the original web page to identify a set of selectable content elements;

comparing the multiple versions of the web page to identify static and dynamic content elements;

presenting a representation of the original web page in a user interface, wherein the selectable content elements are demarcated and marked as either static or dynamic elements;

responsive to user input, selecting content elements for inclusion in the filter; and constructing the filter so that the selected content elements are extracted from a retrieved web page from the content provider web server and reused in the recast web page.

2. The method as recited in claim 1, wherein a plurality of web pages from the content provider web server are parsed to identify the set of selectable content elements.

3. The method as recited in claim 1, wherein a set of varied headers are used to retrieve multiple versions of the same web page.

4. The method as recited in claim 1, further comprising the steps of:

associating a URL with the filter; and using the filter to extract web content from web pages from the associated URL.

5. The method as recited in claim 1, further comprising the steps of:

associating a label with each respective selected content element;

using the filter to extract selected content elements from a web page from a web content provider web site;

using the associated labels to insert the selected content elements into a web page template containing a hosting web server format, thus creating the recast web page; and serving the recast web page to the client browser;

wherein the appearance of the recast page when presented by the client browser is as though all elements originated at the hosting web server.

6. The method as recited in claim 5, wherein one of the desired content elements is an advertisement element from the content provider web server, and the method further comprises the step of inserting a call back to the content provider web server for the advertising element.

7. The method as recited in claim 5, further comprising the step of processing the desired content elements to eliminate harmful code, prior to insertion in the web page template.

8. A method for defining a filter used to extract web content from a web page for reuse in a recast web page, comprising the steps of:

parsing a web page to identify a set of selectable content elements;

parsing multiple versions of the web page to identify dynamic and static selectable content elements;

presenting a representation of the original web page in a user interface, wherein whether a given selectable content element is dynamic or static is indicated;

responsive to user input, selecting content elements for inclusion in the filter; and constructing the filter so that the selected content elements are extracted from a retrieved web page from the web server and reused in the recast web page.

9. The method as recited in claim 8, further comprising the steps of:

selecting at least one web page representative of a set of web pages on a web server; and including link data in the filter so that when one of the set of pages is called, the filter is used to extract selected content elements from the called page.

10. The method as recited in claim 9, wherein a plurality of filters are constructed for a web site on the web server, each for a respective set of pages on the web site.

11. The method as recited in claim 9, wherein the link data included in the filter is a URL having a wildcarded ending.

12. The method as recited claim 8, further comprising the steps of:

calling a set of web pages from a web server for a web site;

using the filter to extract selected content elements from each of the set of web pages;

using the extracted content elements to construct a new set of web pages for the web site.

13. A method for defining a filter used to extract web content from a web page for reuse in a recast web page, comprising the steps of:

parsing a web page to identify a set of selectable content elements;

presenting a representation of the original web page in a user interface;

responsive to detecting selection of a content element, presenting a pop-up of labels available for the selected content element;

responsive to selection of one of the labels, associating the label with the selected content element;

responsive to user input, selecting content elements for inclusion in the filter; and constructing the filter so that when the filter is used the selected content elements are extracted from a retrieved web page from the web server and reused in the recast web page.

14. The method as recited in claim 12, further comprising the steps of:

parsing data associated with each selectable content element;

matching the parsed data to data in a table of available labels, each available label corresponding to respective web page data; and responsive to a match of the parsed data to data in the table, highlighting the corresponding label in the pop-up of labels.

15. The method as recited in claim 8, further comprising the step of presenting a demarcation of each selectable element in the web page representation.

16. The method as recited in claim 8, further comprising the steps of:

determining client specific information about a client browser from which a request originated;

selecting among a set of filters stored in a filter definition database on a hosting server based on the client specific information, wherein each of the filters extracts different selected content elements from a web page; and using the selected filter for creating a recast web page to be sent to the client browser.

17. A system including processor and memory for defining a filter used to extract web content from a web page for reuse in a recast web page, comprising:

means for parsing a web page to identify a set of selectable content elements;

means for parsing multiple versions of the web page to identify dynamic and static selectable content elements;

means for presenting a representation of the original web page in a user interface having user input sensitive areas corresponding to respective selectable content elements, wherein whether a given selectable content element is dynamic or static is indicated;

means responsive to user input for selecting content elements for inclusion in the filter; and means for constructing the filter so that the selected content elements are extracted from a retrieved web page from the web server and reused in the recast web page.

18. The system as recited in claim 17, wherein the system is a hosting system further comprising:

means for receiving requests from client browsers;

means for retrieving web pages from web content provider servers;

means for using the filter to extract selected content elements in the retrieved pages;

means for recasting the extracted content elements in recast pages; and means for sending the recast pages to the client browsers.

19. The system as recited in claim 18 further comprising:
means for storing constructed filters;
means for selecting a filter from the storing means; and
means for using the selected filter for extracting selected content elements from the received web pages for constructing recast web pages in a hosting server format.

20. The method as recited in claim 17, further comprising:
means for selecting at least one web page representative of a set of web pages on a web server; and
means for including link data in the filter; and
means for using the included link data so that when one of the set of pages is retrieved responsive to a client request, the filter is used to extract selected content elements from the retrieved page.

21. The system as recited in claim 17, further comprising:
a store for a plurality of filters, wherein a set of the plurality of filters is constructed for a content provider web site on a web server, each filter for a respective set of pages on the content provider web site
means for presenting a representation of the original web page in a user interface having user input sensitive areas corresponding to respective selectable content elements.

22. A computer program product in a computer readable medium for defining a filter used to extract web content from a web page for reuse in a recast web page, comprising:
means for parsing a web page to identify a set of selectable content elements;
means for parsing multiple versions of the web page to identify dynamic and static selectable content elements;
means for presenting a representation of the original web page in a user interface, wherein whether a given selectable content element is dynamic or static is indicated;
means responsive to user input for selecting content elements for inclusion in the filter; and
means for constructing the filter so that the selected content elements are extracted from a retrieved web page from the web server and reused in the recast web page.

23. The product as recited in claim 22 further comprising means for linking each selected content element with a template for creating a recast web page.

24. The product as recited in claim 23, further comprising:
means for selecting at least one web page representative of a set of web pages on a web server; and
means for including link data in the filter so that when one of the set of pages is called, the filter is used to extract selected content elements from the called page.

25. The product as recited in claim 22, further comprising:
means for retrieving a set of web pages from a web server for a web site;
means for using the filter to extract selected content elements from each of the set of web pages;
means for using the extracted content elements to construct a new set of web pages for the web site.

26. A computer program product in a computer readable medium for defining a filter used to extract web content from a web page for reuse in a recast web page, comprising:
means for parsing a web page to identify a set of selectable content elements;
means for presenting a representation of the original web page in a user interface;
means for presenting a set of labels available for the selected content element;
means for associating selected labels with respective selected content elements;
means responsive to user input for selecting content elements for inclusion in the filter; and
means for constructing the filter so that the selected content elements are extracted from a retrieved web page from the web server and reused in the recast web page.

27. The product as recited in claim 22, further comprising means for presenting a demarcation of each selectable element in the web page representation.

* * * * *